（12） United States Patent
Brisebois et al.

(10) Patent No.: US 8,812,049 B2
(45) Date of Patent: Aug. 19, 2014

(54) FEMTO CELL SIGNALING GATING

(71) Applicant: AT&T Mobility II LLC, Atlanta, GA (US)

(72) Inventors: Arthur Richard Brisebois, Cumming, GA (US); Kurt Donald Huber, Kennesaw, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/090,802

(22) Filed: Nov. 26, 2013

(65) Prior Publication Data
US 2014/0080499 A1 Mar. 20, 2014

Related U.S. Application Data

(63) Continuation of application No. 12/175,293, filed on Jul. 17, 2008, now Pat. No. 8,626,223.

(60) Provisional application No. 61/051,273, filed on May 7, 2008, provisional application No. 61/052,813, filed on May 13, 2008.

(51) Int. Cl.
*H04B 7/00* (2006.01)
(52) U.S. Cl.
USPC ....... 455/522; 455/127.5; 455/574; 455/41.2; 370/318; 370/328
(58) Field of Classification Search
CPC . H04L 5/0048; H04L 5/0078; H04W 52/244; H04W 52/325; H04W 84/045
See application file for complete search history.

(56) References Cited

U.S. PATENT DOCUMENTS 5,745,559 A 4/1998 Weir
5,864,764 A 1/1999 Thro et al.
(Continued)

FOREIGN PATENT DOCUMENTS

CN 1429005 A 12/2001
CN 101017554 8/2007
(Continued)

OTHER PUBLICATIONS

International Search Report and Written Opinion dated Oct. 27, 2009 for PCT Application Serial No. PCT/US2009/043861, 14 Pages.
(Continued)

*Primary Examiner* — Vladimir Magloire
(74) *Attorney, Agent, or Firm* — Amin, Turocy & Watson, LLP

(57) ABSTRACT

Signaling in a femto cell access point is managed. A pilot signal power profile, or pilot signal gating, determines transmitted a time-dependent pilot signal power. The power profile displays a duty cycle well below 100% and a power depth, which is the amplitude between maximum and minimum pilot signal power, determined partially upon radio link conditions. The time-dependent power profile can be established through a schedule based at least in part on attachment data or subscriber input; machine-learning method facilitate inferring the schedule. Pilot signal gating profile can be reused in a femto cell deployment to broaden femto cell identification and thus facilitate macro-to-femto handover. Activating/deactivating pilot signal in a femto cell in the scheduled and synchronized manner provided herein leads to macro-femto interference mitigation and mobility improvement(s), and improved battery life of wireless devices that operate in a wireless environment that includes femto cells.

20 Claims, 11 Drawing Sheets

(56) References Cited

U.S. PATENT DOCUMENTS

| | | |
|---|---|---|
| 6,052,594 A | 4/2000 | Chuang et al. |
| 6,151,505 A | 11/2000 | Larkins |
| 6,208,659 B1 | 3/2001 | Govindarajan et al. |
| 6,219,786 B1 | 4/2001 | Cunningham et al. |
| 6,256,504 B1 | 7/2001 | Tell et al. |
| 6,266,537 B1 | 7/2001 | Kashitani et al. |
| 6,295,454 B1 | 9/2001 | Havinis et al. |
| 6,363,261 B1 | 3/2002 | Raghavan |
| 6,483,852 B1 | 11/2002 | Jacquet et al. |
| 6,484,096 B2 | 11/2002 | Wong |
| 6,512,478 B1 | 1/2003 | Chien |
| 6,710,651 B2 | 3/2004 | Forrester |
| 6,718,023 B1 | 4/2004 | Zolotov |
| 6,768,722 B1 | 7/2004 | Katseff et al. |
| 7,080,139 B1 | 7/2006 | Briggs et al. |
| 7,142,861 B2 | 11/2006 | Murai |
| 7,146,153 B2 | 12/2006 | Russell |
| 7,209,739 B1 | 4/2007 | Narayanabhatla |
| 7,277,410 B2 | 10/2007 | Horneman |
| 7,317,931 B2 | 1/2008 | Guo |
| 7,370,356 B1 | 5/2008 | Guo |
| 7,437,755 B2 | 10/2008 | Farino et al. |
| 7,493,390 B2 | 2/2009 | Bobde et al. |
| 7,496,383 B2 | 2/2009 | Kurata |
| 7,509,124 B2 | 3/2009 | O'Neil |
| 7,516,219 B2 | 4/2009 | Moghaddam et al. |
| 7,558,251 B1 | 7/2009 | Huang et al. |
| 7,574,731 B2 | 8/2009 | Fascenda et al. |
| 7,613,444 B2 | 11/2009 | Lindqvist et al. |
| 7,614,078 B1 | 11/2009 | Stieglitz et al. |
| 7,623,857 B1 | 11/2009 | O'Neil |
| 7,633,910 B2 | 12/2009 | Zhun et al. |
| 7,751,826 B2 | 7/2010 | Gardner |
| 7,761,526 B2 | 7/2010 | Pounds et al. |
| 7,768,983 B2 | 8/2010 | Nylander et al. |
| 7,853,265 B1 | 12/2010 | Ahmad et al. |
| 7,885,644 B2 | 2/2011 | Gallagher et al. |
| 7,929,537 B2 | 4/2011 | Vasudevan et al. |
| 7,929,970 B1 | 4/2011 | Gunasekara |
| 7,941,144 B2 | 5/2011 | Nylander et al. |
| 7,995,994 B2 | 8/2011 | Khetawat et al. |
| 8,064,909 B2 | 11/2011 | Spinelli et al. |
| 8,103,285 B2 | 1/2012 | Kalhan et al. |
| 8,108,923 B1 | 1/2012 | Satish et al. |
| 8,265,685 B2 | 9/2012 | Vikberg et al. |
| 8,437,745 B2 | 5/2013 | Theppasaandra et al. |
| 8,509,778 B2 | 8/2013 | Buchmayer et al. |
| 2002/0044639 A1 | 4/2002 | Shioda et al. |
| 2002/0077115 A1 | 6/2002 | Ruutu et al. |
| 2002/0098837 A1 | 7/2002 | Ferrario et al. |
| 2002/0107018 A1 | 8/2002 | Nakamura et al. |
| 2002/0123365 A1 | 9/2002 | Thorson |
| 2002/0142791 A1 | 10/2002 | Chen et al. |
| 2003/0028621 A1 | 2/2003 | Furlong et al. |
| 2003/0109271 A1 | 6/2003 | Lewis et al. |
| 2003/0125044 A1 | 7/2003 | Deloach |
| 2003/0133558 A1 | 7/2003 | Kung et al. |
| 2003/0139180 A1 | 7/2003 | McIntosh et al. |
| 2003/0142637 A1 | 7/2003 | Khawer et al. |
| 2003/0144793 A1 | 7/2003 | Melaku et al. |
| 2003/0153302 A1 | 8/2003 | Lewis et al. |
| 2004/0111382 A1 | 6/2004 | Haji-Ioannou |
| 2004/0125781 A1 | 7/2004 | Walter et al. |
| 2004/0203846 A1 | 10/2004 | Caronni et al. |
| 2004/0235455 A1 | 11/2004 | Jiang |
| 2004/0236702 A1 | 11/2004 | Fink et al. |
| 2004/0258003 A1 | 12/2004 | Kotot et al. |
| 2004/0264428 A1 | 12/2004 | Choi et al. |
| 2005/0003797 A1 | 1/2005 | Baldwin |
| 2005/0009499 A1 | 1/2005 | Koster |
| 2005/0024201 A1 | 2/2005 | Culpepper et al. |
| 2005/0026650 A1 | 2/2005 | Russell |
| 2005/0075114 A1 | 4/2005 | Dennison et al. |
| 2005/0108529 A1 | 5/2005 | Juneau |
| 2005/0144279 A1 | 6/2005 | Wexelblat |
| 2005/0160276 A1 | 7/2005 | Braun et al. |
| 2005/0172148 A1 | 8/2005 | Ying |
| 2005/0177645 A1 | 8/2005 | Dowling et al. |
| 2005/0223389 A1 | 10/2005 | Klein et al. |
| 2005/0239448 A1 | 10/2005 | Bayne |
| 2005/0250527 A1 | 11/2005 | Jugl |
| 2005/0254451 A1 | 11/2005 | Grosbach |
| 2005/0255893 A1 | 11/2005 | Jin et al. |
| 2005/0259654 A1 | 11/2005 | Faulk, Jr. |
| 2005/0269402 A1 | 12/2005 | Spitzer et al. |
| 2005/0283518 A1 | 12/2005 | Sargent |
| 2006/0031387 A1 | 2/2006 | Hamzeh et al. |
| 2006/0031493 A1 | 2/2006 | Cugi |
| 2006/0046647 A1 | 3/2006 | Parikh et al. |
| 2006/0074814 A1 | 4/2006 | Lovell et al. |
| 2006/0075098 A1 | 4/2006 | Becker et al. |
| 2006/0182074 A1 | 8/2006 | Kubler et al. |
| 2006/0223498 A1 | 10/2006 | Gallagher et al. |
| 2006/0244589 A1 | 11/2006 | Schranz |
| 2006/0281457 A1 | 12/2006 | Huotari et al. |
| 2007/0002844 A1 | 1/2007 | Ali |
| 2007/0008894 A1 | 1/2007 | Lynch et al. |
| 2007/0025245 A1 | 2/2007 | Porras et al. |
| 2007/0032225 A1 | 2/2007 | Konicek et al. |
| 2007/0032269 A1 | 2/2007 | Shostak |
| 2007/0066318 A1 | 3/2007 | Danzeisen et al. |
| 2007/0074272 A1 | 3/2007 | Watanabe |
| 2007/0094601 A1 | 4/2007 | Greenberg et al. |
| 2007/0097093 A1 | 5/2007 | Oshita et al. |
| 2007/0097938 A1 | 5/2007 | Nylander et al. |
| 2007/0097939 A1 | 5/2007 | Nylander et al. |
| 2007/0097983 A1 | 5/2007 | Nylander et al. |
| 2007/0099561 A1 | 5/2007 | Voss |
| 2007/0104166 A1 | 5/2007 | Rahman et al. |
| 2007/0111706 A1 | 5/2007 | Kumar et al. |
| 2007/0123253 A1 | 5/2007 | Simongini et al. |
| 2007/0124802 A1 | 5/2007 | Anton et al. |
| 2007/0133563 A1 | 6/2007 | Hundscheidt et al. |
| 2007/0150732 A1 | 6/2007 | Hidehiko et al. |
| 2007/0155421 A1 | 7/2007 | Alberth et al. |
| 2007/0167175 A1 | 7/2007 | Wong |
| 2007/0183427 A1 | 8/2007 | Nylander et al. |
| 2007/0184815 A1 | 8/2007 | Aebi |
| 2007/0199076 A1 | 8/2007 | Rensin et al. |
| 2007/0220252 A1 | 9/2007 | Sinko et al. |
| 2007/0232332 A1 | 10/2007 | Holur et al. |
| 2007/0258418 A1 | 11/2007 | Wurtenberger et al. |
| 2007/0270152 A1 | 11/2007 | Nylander et al. |
| 2007/0275739 A1 | 11/2007 | Blackburn |
| 2007/0287501 A1 | 12/2007 | Hoshina |
| 2008/0043972 A1 | 2/2008 | Ruetschi et al. |
| 2008/0049702 A1 | 2/2008 | Meylan et al. |
| 2008/0065752 A1 | 3/2008 | Ch'ng et al. |
| 2008/0076392 A1 | 3/2008 | Khetawat et al. |
| 2008/0076393 A1 | 3/2008 | Khetawat et al. |
| 2008/0076398 A1 | 3/2008 | Mate et al. |
| 2008/0076412 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0081636 A1 | 4/2008 | Nylander et al. |
| 2008/0082538 A1 | 4/2008 | Meijer et al. |
| 2008/0119160 A1 | 5/2008 | Andriantsiferana et al. |
| 2008/0126531 A1 | 5/2008 | Setia et al. |
| 2008/0132239 A1 | 6/2008 | Khetawat et al. |
| 2008/0133742 A1 | 6/2008 | Southiere et al. |
| 2008/0141348 A1 | 6/2008 | Hovnanian et al. |
| 2008/0151807 A1 | 6/2008 | Meier et al. |
| 2008/0168099 A1 | 7/2008 | Skaf |
| 2008/0181184 A1 | 7/2008 | Kezys |
| 2008/0201076 A1 | 8/2008 | Huang et al. |
| 2008/0207170 A1 | 8/2008 | Khetawat et al. |
| 2008/0242280 A1 | 10/2008 | Shapiro et al. |
| 2008/0244148 A1 | 10/2008 | Nix et al. |
| 2008/0254792 A1 | 10/2008 | Ch'ng |
| 2008/0261602 A1 | 10/2008 | Livneh |
| 2008/0274753 A1 | 11/2008 | Attar et al. |
| 2008/0281687 A1 | 11/2008 | Hurwitz et al. |
| 2008/0282327 A1 | 11/2008 | Winget et al. |

(56) References Cited

U.S. PATENT DOCUMENTS

| | | |
|---|---|---|
| 2008/0299984 A1 | 12/2008 | Shimomura |
| 2008/0299992 A1 | 12/2008 | Eitan et al. |
| 2008/0305792 A1 | 12/2008 | Khetawat et al. |
| 2008/0305801 A1 | 12/2008 | Burgess et al. |
| 2008/0305834 A1 | 12/2008 | Janiszewski et al. |
| 2008/0318551 A1 | 12/2008 | Palamara et al. |
| 2009/0012898 A1 | 1/2009 | Sharma et al. |
| 2009/0031006 A1 | 1/2009 | Johnson et al. |
| 2009/0037973 A1 | 2/2009 | Gustave et al. |
| 2009/0042593 A1 | 2/2009 | Yavuz et al. |
| 2009/0046665 A1 | 2/2009 | Robson et al. |
| 2009/0047945 A1 | 2/2009 | Zhang |
| 2009/0059822 A1 | 3/2009 | Morrill et al. |
| 2009/0061821 A1 | 3/2009 | Chen et al. |
| 2009/0061873 A1 | 3/2009 | Bao et al. |
| 2009/0077620 A1 | 3/2009 | Ravi et al. |
| 2009/0082010 A1 | 3/2009 | Lee |
| 2009/0082020 A1 | 3/2009 | Ch'ng et al. |
| 2009/0092080 A1 | 4/2009 | Balasubramanian et al. |
| 2009/0092081 A1 | 4/2009 | Balasubramanian et al. |
| 2009/0092096 A1 | 4/2009 | Czaja |
| 2009/0092097 A1 | 4/2009 | Nylander et al. |
| 2009/0093232 A1 | 4/2009 | Gupta et al. |
| 2009/0094351 A1 | 4/2009 | Gupta et al. |
| 2009/0094680 A1 | 4/2009 | Gupta et al. |
| 2009/0097436 A1 | 4/2009 | Vasudevan et al. |
| 2009/0098871 A1 | 4/2009 | Gogic |
| 2009/0111499 A1 | 4/2009 | Bosch |
| 2009/0122773 A1 | 5/2009 | Gogic |
| 2009/0124262 A1 | 5/2009 | Vela et al. |
| 2009/0129336 A1 | 5/2009 | Osborn et al. |
| 2009/0129350 A1 | 5/2009 | Khandekar et al. |
| 2009/0131050 A1 | 5/2009 | Osborn |
| 2009/0131098 A1 | 5/2009 | Khandekar et al. |
| 2009/0135749 A1 | 5/2009 | Yang |
| 2009/0135794 A1 | 5/2009 | Su et al. |
| 2009/0156213 A1 | 6/2009 | Spinelli et al. |
| 2009/0161682 A1 | 6/2009 | Johnson et al. |
| 2009/0163216 A1 | 6/2009 | Hoang et al. |
| 2009/0163224 A1 | 6/2009 | Dean |
| 2009/0164547 A1 | 6/2009 | Ch'ng et al. |
| 2009/0170440 A1 | 7/2009 | Eyuboglu et al. |
| 2009/0170528 A1 | 7/2009 | Bull et al. |
| 2009/0180428 A1 | 7/2009 | Viswanath |
| 2009/0191844 A1 | 7/2009 | Morgan et al. |
| 2009/0191845 A1 | 7/2009 | Morgan et al. |
| 2009/0210324 A1 | 8/2009 | Bhogal |
| 2009/0213825 A1 | 8/2009 | Gupta et al. |
| 2009/0215429 A1 | 8/2009 | Caldwell et al. |
| 2009/0215452 A1 | 8/2009 | Balasubramanian et al. |
| 2009/0221303 A1 | 9/2009 | Soliman |
| 2009/0233574 A1 | 9/2009 | Shinozaki |
| 2009/0245176 A1 | 10/2009 | Balasubramanian et al. |
| 2009/0247157 A1 | 10/2009 | Yoon et al. |
| 2009/0253421 A1 | 10/2009 | Camp et al. |
| 2009/0253432 A1 | 10/2009 | Willey et al. |
| 2009/0257434 A1 | 10/2009 | Song et al. |
| 2009/0279701 A1 | 11/2009 | Moisand et al. |
| 2009/0291667 A1 | 11/2009 | Vakil et al. |
| 2009/0325634 A1 | 12/2009 | Bienas et al. |
| 2010/0022266 A1 | 1/2010 | Villier |
| 2010/0040026 A1 | 2/2010 | Melkesetian |
| 2010/0048165 A1 | 2/2010 | Caldwell et al. |
| 2010/0113067 A1 | 5/2010 | Fullam et al. |
| 2010/0167777 A1* | 7/2010 | Raghothaman et al. ...... 455/522 |
| 2010/0260068 A1 | 10/2010 | Bhatt et al. |
| 2011/0177794 A1 | 7/2011 | Nylander et al. |
| 2011/0200022 A1 | 8/2011 | Annamalai |
| 2011/0280154 A1 | 11/2011 | Silverstrim et al. |
| 2012/0258711 A1 | 10/2012 | Bao et al. |
| 2013/0165079 A1 | 6/2013 | Gogic |

FOREIGN PATENT DOCUMENTS

| | | |
|---|---|---|
| CN | 101175333 A | 5/2008 |
| GB | 2425291 A | 10/2006 |
| GB | 2425921 A | 11/2006 |
| JP | 20010264096 | 9/2001 |
| JP | 2003022303 | 1/2003 |
| JP | 2003088521 | 10/2003 |
| JP | 2004112324 | 4/2004 |
| JP | 2005073147 | 3/2005 |
| JP | 2005215849 | 8/2005 |
| JP | 20060674143 | 3/2006 |
| JP | 2008048055 | 2/2008 |
| WO | 02-14987 A2 | 2/2002 |
| WO | 2005076964 A2 | 8/2005 |
| WO | 2007015067 A2 | 2/2007 |
| WO | 2007040449 A1 | 4/2007 |
| WO | 2008047039 A1 | 4/2008 |

OTHER PUBLICATIONS

International Search Report and Written Opinion mailed Feb. 23, 2010, for PCT Application No. PCT/US2009/043846, 13 pages.

Office Action dated Dec. 31, 2009 for U.S. Appl. No. 11/457,129, 16 pages.

Office Action dated Apr. 17, 2009 for U.S. Appl. No. 11/276,269, 15 pages.

Office Action dated Nov. 4, 2008 for U.S. Appl. No. 11/276,269, 15 pages.

Office Action dated Jun. 17, 2010 for U.S. Appl. No. 11/457,129, 15 pages.

Kaul, "Verizon's $250 femto box—A deliberate ploy behind the aggressive pricing?" Posted Tue, Jan. 20, 2009 13:19:46 EST; http://www.abiresearch.com/research_blog/569; © 2009 Allied Business Intelligence, Inc.

Office Action dated Mar. 29, 2011 for U.S. Appl. No. 12/276,002, 37 pages.

Office Action dated Apr. 13, 2011 for U.S. Appl. No. 12/276,058, 40 pages.

Office Action dated Apr. 19, 2011 for U.S. Appl. No. 12/276,238, 22 pages.

Office Action dated May 5, 2011 for U.S. Appl. No. 12/275,015, 32 pages.

Office Action dated Jun. 14, 2011 for U.S. Appl. No. 12/275,878, 35 pages.

Office Action dated Jun. 22, 2011 for U.S. Appl. No. 12/484,072, 38 pages.

Office Action dated Jul. 7, 2011 for U.S. Appl. No. 12/276,257, 24 pages.

Office Action dated Jun. 28, 2011 for U.S. Appl. No. 12/275,925, 18 pages.

Office Action dated Jun. 8, 2011 for U.S. Appl. No. 12/484,026, 30 pages.

Office Action dated Aug. 18, 2011 for U.S. Appl. No. 12/275,416, 39 pages.

Office Action dated Sep. 14, 2011 for U.S. Appl. No. 12/276,002, 35 pages.

Office Action dated Oct. 5, 2011 for U.S. Appl. No. 12/276,058, 37 pages.

Office Action dated Oct. 6, 2011 for U.S. Appl. No. 12/465,483, 50 pages.

Office Action dated Oct. 4, 2011 for U.S. Appl. No. 12/484,135, 44 pages.

Office Action dated Jul. 21, 2011 for U.S. Appl. No. 12/175,293, 30 pages.

Office Action dated Oct. 24, 2011 for U.S. Appl. No. 12/275,925, 14 pages.

Office Action dated Nov. 30, 2011 for U.S. Appl. No. 12/275,878, 38 pages.

Office Action dated Dec. 1, 2011 for U.S. Appl. No. 12/275,996, 44 pages.

Office Action dated Oct. 25, 2011 for U.S. Appl. No. 12/465,580, 39 pages.

(56) References Cited

OTHER PUBLICATIONS

Office Action dated Nov. 8, 2011 for U.S. Appl. No. 12/465,468, 50 pages.
Office Action dated Jan. 5, 2012 for U.S. Appl. No. 12/465,585, 43 pages.
Office Action dated Dec. 28, 2011 for U.S. Appl. No. 12/175,293, 38 pages.
Office Action dated Nov. 21, 2011 for U.S. Appl. No. 12/484,026, 37 pages.
Office Action dated Dec. 14, 2011 for U.S. Appl. No. 12/484,072, 44 pages.
Office Action dated Nov. 1, 2011 for U.S. Appl. No. 12/816,087, 33 pages.
Office Action dated Mar. 5, 2012 for U.S. Appl. No. 12/465,598, 55 pages.
Office Action dated May 8, 2012 for U.S. Appl. No. 11/457,129, 38 pages.
Office Action dated Mar. 19, 2012 for U.S. Appl. No. 12/276,120, 68 pages.
Office Action dated Mar. 30, 2012 for U.S. Appl. No. 12/484,026, 30 pages.
Notice of Allowance dated Apr. 3, 2012 for U.S. Appl. No. 12/275,996, 38 pages.
Office Action dated Apr. 10, 2012 for U.S. Appl. No. 12/275,416, 32 pages.
Office Action dated Apr. 10, 2012 for U.S. Appl. No. 12/484,135, 45 pages.
Notice of Allowance dated Apr. 25, 2012 for U.S. Appl. No. 12/465,468, 35 pages.
Office Action dated Jul. 16, 2012 for U.S. Appl. No. 12/275,878, 37 pages.
Office Action dated Jul. 10, 2012 for U.S. Appl. No. 12/465,585, 32 pages.
Office Action dated Apr. 13, 2012 for U.S. Appl. No. 13/316,106, 35 pages.
Office Action dated Sep. 5, 2012 for U.S. Appl. No. 12/276,120, 49 pages.
Office Action dated Aug. 16, 2012 for U.S. Appl. No. 12/465,598, 31 pages.
Office Action dated Sep. 6, 2012 for U.S. Appl. No. 12/579,957, 51 pages.
Office Action dated Sep. 10, 2012 for U.S. Appl. No. 12/276,002, 54 pages.
Office Action dated Oct. 2, 2012 for U.S. Appl. No. 12/484,026, 29 pages.
Office Action dated Oct. 11, 2012 for U.S. Appl. No. 13/487,794, 45 pages.
Office Action dated Oct. 9, 2012 for U.S. Appl. No. 13/298,924, 51 pages.
Office Action dated Nov. 1, 2012 for U.S. Appl. No. 12/276,058, 59 pages.
Office Action dated Nov. 5, 2012 for U.S. Appl. No. 12/484,072, 52 pages.
Office Action dated Nov. 20, 2012 for U.S. Appl. No. 12/275,878, 28 pages.
Japanese Office Action mailed Sep. 13, 2012 for Japanese Patent Application No. 2011-509669, 10 pages.
Canadian Office Action mailed Oct. 30, 2012 for Canadian Patent Application No. 2,722,324, 3 pages.
Japanese Office Action mailed Sep. 13, 2012 for Japanese Patent Application No. 2011-509675, 4 pages.
Office Action dated Dec. 3, 2012 for U.S. Appl. No. 12/275,416, 33 pages.
Office Action dated Jan. 17, 2013 for U.S. Appl. No. 13/554,710, 42 pages.
Final Office Action dated Feb. 15, 2013 for U.S. Appl. No. 12/579,957.
Office Action dated Feb. 26, 2013 for U.S. Appl. No. 12/276,120, 59 pages.
Chinese Office Action for Chinese Application No. 200980117263.8 dated Feb. 16, 2013, 7 pages.
Chinese Office Action for Chinese Application No. 200980117188.5 dated Jan. 31, 2013, 11 pages.
Final Office Action dated Mar. 14, 2013 for U.S. Appl. No. 12/484,072, 34 pages.
Office Action dated Apr. 23, 2013 for U.S. Appl. No. 12/175,293, 41 pages.
Canadian Office Action mailed Mar. 26, 2013 for Canadian Patent Application No. 2,722,324, 4 pages.
Office Action dated Jul. 15, 2013 for U.S. Appl. No. 13/554,710, 37 pages.
Office Action dated Aug. 13, 2013 for U.S. Appl. No. 12/276,120, 66 pages.
Office Action dated Aug. 12, 2013 for U.S. Appl. No. 12/275,416, 36 pages.
Office Action dated Sep. 9, 2013 for U.S. Appl. No. 12/465,585, 45 pages.
Office Action dated Oct. 2, 2013 for U.S. Appl. No. 12/275,878, 38 pages.
Office Action dated Oct. 3, 2013 for U.S. Appl. No. 13/892,923, 62 pages.
Office Action dated Oct. 22, 2013 for U.S. Appl. No. 13/898,910, 50 pages.
Office Action dated Oct. 3, 2013 for U.S. Appl. No. 13/934,644, 17 pages.
Chinese Office Action dated Oct. 24, 2013 for Chinese Patent Application No. 200980117263.8, 13 pages.
Chinese Office Action dated Oct. 21, 2013 for Chinese Patent Application No. 200980117188.5, 11 pages.
Japanese Office Action dated Oct. 3, 2013 for Japanese Patent Application No. 2011-509669, 15 pages.
Office Action dated Dec. 12, 2013 for U.S. Appl. No. 12/276,120, 78 pages.
Notice of Allowance dated Feb. 13, 2014 for U.S. Appl. No. 12/275,878, 34 pages.
Hasan, Mohammad Masud; Huang, Xiadong; Jue, Jason P.; "Survivable Wireless Access Network Design with Dual-homing Capabilities"; IEEE Global Telecommunications Conference, Nov. 27-Dec. 1, 2006, 5 pgs.
Japanese Office Action dated Jan. 16, 2014 for Japanese Patent Application No. 2013-026198, 8 pages.
Office Action dated Mar. 26, 2014 for U.S. Appl. No. 12/465,585, 44 pages.
Final Office Action dated Mar. 26, 2014 for U.S. Appl. No. 12/465,585, 44 pages.
Office Action dated Mar. 24, 2014 for U.S. Appl. No. 13/934,644, 50 pages.
Office Action dated Mar. 24, 2014 for U.S. Appl. No. 13/671,191, 63 pages.
Office Action dated Jun. 9, 2014 for U.S. Appl. No. 12/276,120, 92 Pages.
Office Action dated Jun. 11. 2014 for U.S. Appl. No. 13/675,150, 68 Pages.
Chinese Office Action dated Jun. 19, 2014 for Chinese Patent Application No. 200980117188.5, 5 Pages.
Canadian Office Action dated May 13, 2014 for Canadian Patent Application 2,722,367, 5 Pages.

* cited by examiner

FEMTO CELL SIGNALING GATING

CROSS REFERENCE TO RELATED APPLICATIONS

This application is a continuation of U.S. patent application Ser. No. 12/175,293 filed on Jul. 17, 2008 entitled, "FEMTO CELL SIGNALING GATING," which claims the benefit of U.S. Provisional Application No. 61/051,273 filed on May 7, 2008, entitled "SIGNALING-TRIGGERED POWER ADJUSTMENT IN A FEMTO CELL," and U.S. Provisional Application No. 61/052,813 filed on May 13, 2008, entitled "MANAGEMENT OF ACCESS TO FEMTO CELL COVERAGE." The entireties of these applications are incorporated herein by reference.

TECHNICAL FIELD

The subject innovation relates to wireless communications and, more particularly, to managing femto cell signaling by activating/deactivating in a scheduled and synchronized manner for at least mitigation of interference and mobility improvement(s).

BACKGROUND

Femto cells—building-based wireless access points interfaced with a wired broadband network—are generally deployed to improve indoor wireless coverage, and to offload a mobility radio access network (RAN) operated by a wireless service provider. Improved indoor coverage includes stronger signal and improved reception (e.g., voice or sound), ease of session or call initiation, and session or call retention as well. Offloading a RAN reduces operational and transport costs for the service provider since a lesser number of end users utilizes over-the-air radio resources (e.g., radio frequency channels), which are typically limited.

Coverage of a femto cell, or femto access point (AP), is generally intended to be confined within the bounds of an indoor compound (e.g., a residential or commercial building) in order to mitigate interference among mobile stations covered by a macro cell and terminals covered by the femto AP. Additionally, confined coverage can reduce cross-talk among terminals serviced by disparate, neighboring femto cells as well. Femto cells typically operate in licensed portions of the electromagnetic spectrum, and generally offer plug-and-play installation; e.g., automatic configuration of femto AP subsequent to femto cell subscriber registration with a service provider. Coverage improvements via femto cells can also mitigate customer attrition as long as a favorable subscriber perception regarding voice coverage and other data services with substantive delay sensitivity is attained. In addition, a richer variety of wireless voice and data services can be offered to customers via a femto cell since such service offerings do not rely primarily on mobility RAN resources.

Regardless the foregoing advantages provided by femto cells, typical operational designs of a femto cell access points generally lead to the following issues. (i) Unnecessary interference to femto cell subscribers in surrounding femto cells, and macro network end users as well, with ensuing reduction in overall network capacity; (ii) unnecessary signaling with nearby handsets unsuccessfully attempting to attach to femto access point(s), which results in a reduction of mobile station battery life; and (iii) additional complexity associated with macro-to-femto handover process.

DETAILED DESCRIPTION

Figure 1:
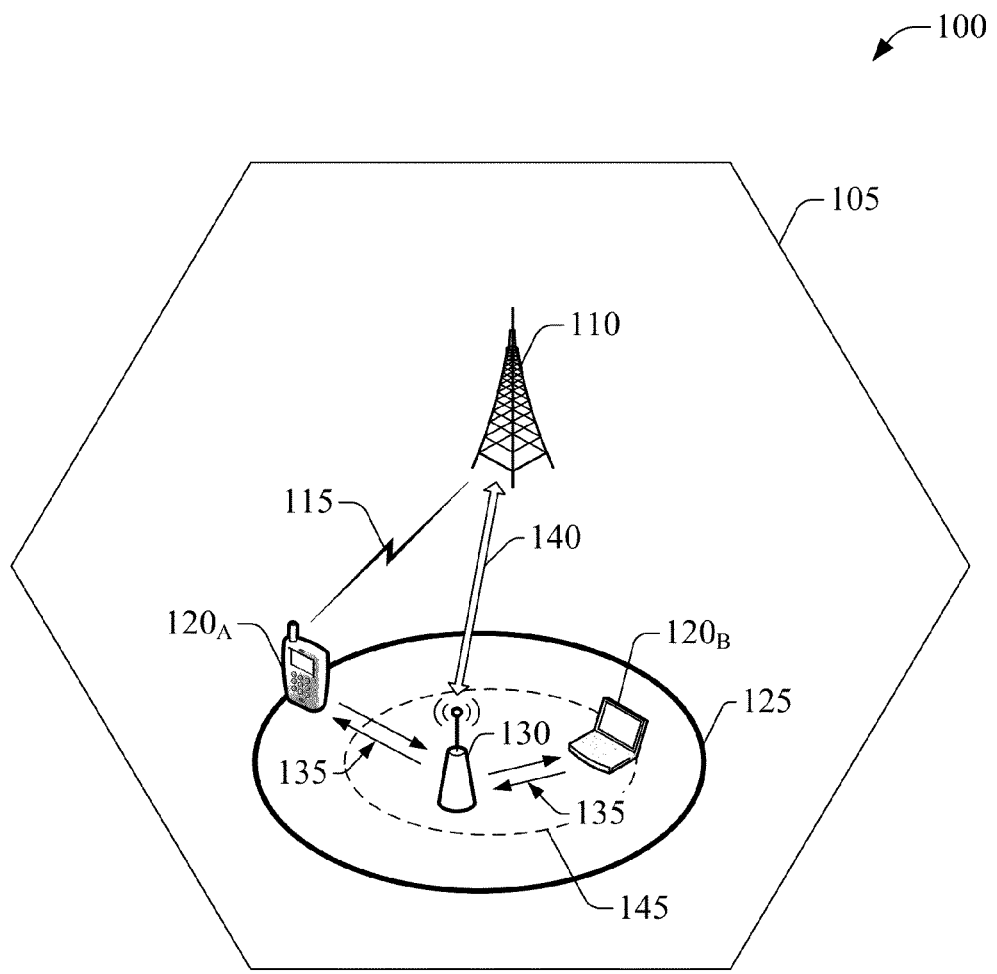
FIG. 1 a schematic deployment of a macro cell and a femto cell for wireless coverage in accordance with aspects described herein.

The subject innovation provides system(s) and method(s) for managing signaling in a femto cell access point. A pilot signal power profile, or pilot signal gating, determines transmitted a time-dependent pilot signal power. The power profile displays a duty cycle well below 100% and a power depth, which is the amplitude between maximum and minimum pilot signal power, determined partially upon radio link conditions. Reduced duty cycle has various advantages when compared to a typical "always on" femto cell design, e.g., femto transmitter conveys substantial power even when an intended coverage area is unoccupied by an authorized subscriber: Activating/deactivating pilot signal in the scheduled and synchronized manner provided in the subject innovation leads to macro-femto interference mitigation and mobility improvement(s), and improved battery life of wireless devices that operate in a wireless environment that includes femto cells.

The time-dependent power profile can be established through a schedule based at least in part on attachment data or subscriber input; machine-learning method facilitate inferring the schedule. In an aspect, a learned schedule that configures a femto cell transmitter to a duty cycle of 100% shortly before an authorized subscriber enters the femto cell coverage area can substantially mitigate delayed femto access for a first subscriber to attach to the AP. Subscriber input can supplement, or complement, learned pilot gating schedules.

Pilot signal gating profile can be reused in a femto cell deployment to broaden femto cell identification (ID) and thus facilitate macro-to-femto handover. Cell ID for femto cells that share a common identifier such as a synchronization scrambling code can be distinguished by a pilot gating phase, e.g., the time-dependent pilot power profile. Such distinction, in combination with an available access list for a femto cell access point can facilitate macro-to-femto handover—particularly in scenarios with high-density deployments of femto cells.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "connector," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

In addition, the terms "wireless network" and "network" are used interchangeable in the subject application, when context wherein the term is utilized warrants distinction for clarity purposes such distinction is made explicit. Likewise, the terms "femto cell access point" and "femto access point" are also utilized interchangeably.

Referring to the drawings, FIG. 1 illustrates a schematic wireless environment (e.g., a network) 100 in which a femto cell can exploit various aspects described in the subject specification. In wireless environment 100, area 105 represents a coverage macro cell which is served by base station 110. It should be appreciated that macro cell 105 is illustrated as a hexagon; however, macro cell(s) can adopt other geometries generally dictated by the deployment or floor plan, geographic areas to be covered, and so on. Macro coverage is generally intended for outdoors locations for servicing mobile wireless devices, like UE $120_A$, and such coverage is achieved via an over-the-air wireless link 115. The wireless link 115 comprises a downlink (DL) and an uplink (UL), and utilizes a predetermined band of the radio frequency (RF) spectrum. In an aspect, UE 120 can be a Third Generation Partnership Project (3GPP) Universal Mobile Telecommunication System (UMTS) mobile phone.

Within macro coverage cell 105, a femto cell 145, served by a femto access point 130, can be deployed. While in illustrative wireless environment 100 a single femto cell appears deployed within the macro cell, a substantive (e.g., $10^3$-$10^6$) number of femto AP 130 can be deployed. A femto cell typically covers an area 125 that is determined, at least in part, by transmission power allocated to femto AP 130, path loss, shadowing, and so forth. It should be appreciated that while coverage area 125 and confined area 145 typically coincide, in certain deployment scenarios, coverage area 125 can include an outdoor portion (e.g., a parking lot, a patio deck, a recreation area such as a swimming pool and nearby space) while are 145 span an enclosed living space. Coverage area typically is spanned by a coverage radius that ranges from 20 to 100 meters. Confined coverage area 145 is generally associated with an indoor area, or a building, like a residential (e.g., a house, a condo, an apartment complex) or small business (e.g., a library, a hospital, a retail store) setting which can span about 5000 sq. ft. Femto AP 130 typically services a few wireless devices (e.g., subscriber station 120$_B$) within confined coverage area 145. In an aspect, femto AP 130 can integrate seamlessly with substantially any packet switched (PS)-based and circuit switched (CS)-based network; for instance, femto AP 130 can integrate into an existing 3GPP Core Network via conventional interfaces like Iu-CS, Iu-PS, Gi, Gn. Thus, operation with a 3GPP wireless device or user equipment with a 3GPP subscriber identity module (SIM) card is substantially straightforward with femto AP 130, and seamless when handoff to macro cell, or vice versa, takes place. It is to be noted that substantially all voice or data active sessions associated with users within femto cell coverage (e.g., area 125) are terminated once the femto AP 130 is shut down; in case of data sessions, data can be recovered at least in part through a buffer associated with a femto gateway at the network. Coverage of a suspended or hotlined subscriber station or associated account can be blocked over the air-interface. However, if a suspended or hotlined customer who owns femto AP 130 is in Hotline/Suspend status, there is no substantive impact to the customers covered through femto AP 130. In another aspect, femto AP 130 can exploit high-speed downlink packet access in order to accomplish substantive bitrates. In yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters.

As a subscriber station (e.g., UE 120$_A$) that exploits macro coverage (e.g., cell 105) enters femto coverage (e.g., area 125), the subscriber station (e.g., UE 120$_A$) attempts to attach to the femto AP 130 through transmission and reception of attachment signaling. The signaling is effected via a FL/RL 135; in an aspect of the subject innovation, the attachment signaling can include a Location Area Update (LAU) and/or Routing Area Update (RAU). Attachment attempts are a part of procedures to ensure mobility, so voice calls and data sessions can continue even after a macro-to-femto transition or vice versa. It is to be noted that UE 120$_A$ can be employed seamlessly after either of the foregoing transitions. In addition, femto networks typically are designed to serve stationary or slow-moving traffic with reduced signaling loads compared to macro networks. A femto service provider (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE 120$_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE 120$_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visitor Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). Through backhaul pipe 140, femto AP 130 can handle substantially any quality of service (QoS) for heterogeneous packetized traffic (e.g., various, multiple packet flows). In an aspect of the subject innovation, femto AP 130 can display status indicators for power, active broadband/DSL connection, and gateway connection. In another aspect, no landline is necessary for femto AP 130 operation.

Figure 2A:
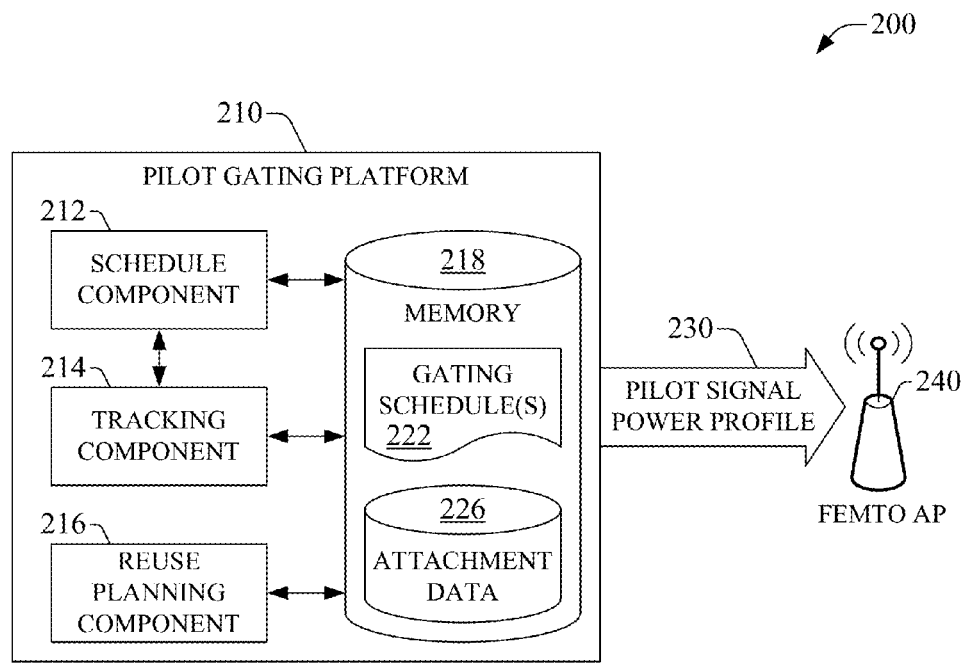
FIGS. 2A and 2B are a block diagram of an example system to generate a pilot signaling power profile and an illustrative example signaling power profile, respectively, in accordance with aspects disclosed herein.
Figure 2B:
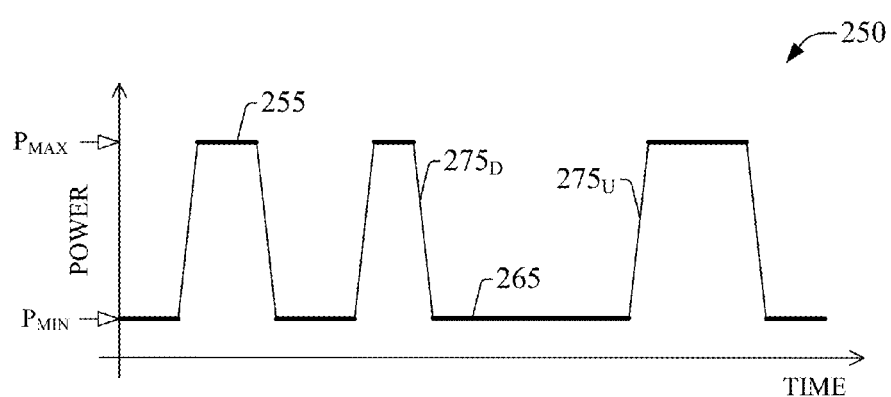

FIGS. 2A and 2B are, respectively, a block diagram of an example system 200 to generate a pilot signaling power profile and an illustrative example signaling power profile 250, respectively. In example system 200, a pilot gating platform 210 generates a pilot signal power profile 230 which can be utilized to gate, or drive, the power of femto access point (e.g., femto AP 130) transmitter. In an aspect of the subject innovation, pilot gating platform can reside within a network management component (e.g., a radio network controller (RNC) in UMTS network(s), a gateway support node . . . ).

To generate pilot power profile 230, pilot gating platform 210 includes a schedule component 212, which is functionally coupled to a tracking component 214. Tracking component 214 can monitor the presence of a subscriber station (e.g., UE 120$_A$) attached to femto access point 240. As an example, in a Universal Mobile Telecommunication Service (UMTS) wireless network, tracking component 214 checks successful Location Area Update (LAU) activity which typically includes request(s)/grant(s) exchanges, when a Visitor Location Register (VLR) for a Location area Code (LAC) associated with femto AP 240 contains a subscriber station (e.g., UE 120A or UE 120B), a successful attachment has occurred. It should be noted that VLR is updated each time a subscriber station successfully attaches to femto AP 240 or detaches from femto AP 240 and attaches to macro cell, e.g., served by Node B 110. It should be appreciated that other storage component(s) or register(s), such as attachment data 226 in memory 218, can be utilized to retain and update UE attachment information. When femto AP 240 VLR includes active subscribers, power of pilot signal (which is also referred as femto AP pilot throughout the subject specification; a term suitable for UMTS network(s)) of femto AP 240 transmitter is set to a substantial magnitude, e.g., $P_{MAX}$, and remains at such value for substantially 100% of the femto AP 240 operational time. It should be appreciated that deactivation of AP pilot power can lead to unnecessary detachment of subscriber station from femto AP 240, and (re)attachment to macro cell.

Therefore, pilot gating platform 210, through tracking component 214, can generate a dynamic pilot signal power profile 230 in response to attachment conditions in femto AP 240. It should be appreciated that such a dynamic pilot signal power profile 230 can posses a duty cycle of substantially 100% (e.g., "busy" period) after a first subscriber station attaches to femto AP 240. The busy period can ensure incoming pages, call attempts, and data exchanges can continue after the first (authorized) subscriber station successfully attaches. In an aspect, the first subscriber station that attaches can be a mobile authorized for coverage (see below) through femto AP 240. The substantially 100% duty cycle of pilot signal power profile 230 remains until subscriber station detaches from femto AP 240. After such event, the pilot gating platform 210 can substantially accurately assume that substantially no page delivery events or support call setup attempts occur when no mobile is attached to femto AP 240; thus, pilot signal duty cycle can be adjusted to a level substantially below 100%. It is to be noted that pilot signal is to be ON, or at $P_{MAX}$ or a substantive fraction thereof, while subscriber station signaling (e.g., attachment/detachment procedure or LAU/RAU) is in progress.

In an aspect of the subject innovation, schedule component 212 can generate a pilot gating schedule plan, whereby pilot gating platform 210 provide a pilot signal power profile 230 in accordance with attachment activity history. Thus, pilot gating component 210 schedule pilot signal gating for low duty cycle when service provided by femto AP 240 is the least utilized by subscriber(s), or high duty cycle (e.g., up to 100%) when femto cell service utilization is substantive. To generate a schedule plan, schedule component 212 can exploit attachment data 226 associated with a set of femto cell APs operated by a service provider. As an example, attachment data 226 includes LAU activity history, which can be collected by tracking component 214. Such historic data can be utilized to identify time intervals when a femto AP (e.g., femto AP 240) is highly likely to serve successfully attached (authorized) subscriber(s). These time intervals warrant a high duty cycle for pilot signal power profile 230 in order to minimize time to camp within femto AP 240 coverage (e.g., area 145).

It is to be noted that attachment data 226 also includes unsuccessful attachment attempts or LAU success ratio, e.g., macro-to-femto handover attempts from unauthorized subscribers, or failed attachment attempts that result from a prior pilot signal power profile 230 unsuitable to a new set of conditions in femto AP 240. For instance, new pilot gating conditions can arise upon a new device is authorized to exploit femto cell service(s); a subscriber that manages femto AP 240 contract a new service; a new access profile is established in view of temporary authorized subscribers like out-of-town family members on vacation, etc. Time intervals associated with failed attachment attempts warrant low pilot signal power duty cycle to mitigate passersby to detect and attempt attachment to femto AP 240 that is substantially unlikely to succeed. A generated schedule plan can be stored in memory 218 as gating schedule(s) 222. At least three advantages of scheduled pilot signal gating, e.g., a scheduled pilot signal power profile 230) are the following. (i) Mitigation of macro-femto interference; (ii) battery life improvement of wireless devices served by macro and femto cells while fast femto AP camping is maintained when substantially needed; and (iii) adjustment of pilot power profile ON/nearly-OFF edges in accordance to physical occupation of femto cell coverage area (e.g., area 145).

Gating schedule(s) 222 can also be based at least in part on a cell ID code (e.g., a scrambling code) reuse distance, or visitation history. With respect to visitation history, schedule component 212 can synchronize pilot signal gating schedules 222 according to visitation pattern of a subscriber. For instance, a transmitter of a home-based femto AP can be powered down shortly after a subscriber leaves the household, and a business-based AP associated with the subscriber workplace can increase transmitter power slightly before an expected, or typical, arrival time of the subscriber. It should be appreciated that such synchronization can be refined by exploiting location services that can provide an expected subscriber's arrival time.

In an aspect of the subject innovation, schedule component 212 can utilize artificial intelligence (AI) methods to infer (e.g., reason and draw a conclusion based upon a set of metrics, arguments, or known outcomes in controlled scenarios) suitable gating schedules(s) 222 for sets of ($10^3$-$10^6$) femto cells. Artificial intelligence techniques typically apply advanced mathematical algorithms—e.g., decision trees, neural networks, regression analysis, principal component analysis (PCA) for feature and pattern extraction, cluster analysis, genetic algorithm, and reinforced learning—to historic attachment data 226 and substantially any other data associated with service provision through femto cell.

In particular, schedule component 212 can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of attachment data 226 to extract patterns of femto cell usage.

In addition, pilot gating platform 210 comprises a reuse planning component 216 which can access memory 218. To provide optimal pilot signal gating reuse, reuse planning component 216 can exploit historic data such as attachment data 226 retained in memory 218, and existing gating schedule(s) 222 as well. In addition, reuse planning component 216 can also utilize artificial intelligent methods substantially similar to those employed by scheduled component 212.

In an aspect, pilot gating reuse plan can be phased based at least in part on inter-femto cell distance. For instance, pilot gating platform 210 through reuse planning component 216 can maximize a distance between femto APs (e.g., femto AP 240) that share a LAC, a cell identification code (e.g., scrambling codes (SCs) or a combination thereof), or a pilot signal power profile reuse. Through suitable pilot gating reuse planning, which can be facilitated by artificial intelligence, a subscriber station within a defined area (e.g., the footprint of a macro Node B neighbor) can detect same LAC and SC from disparate femto APs, yet not at same time(s). The latter can improve macro-to-femto handover as discussed below.

Memory 218 can store various algorithms or procedures, code instructions, data structures like objects, classes and modules, etc., which facilitate at least in part the functionality of pilot gating platform 210.

With respect to FIG. 2B, signaling power profile 250 displays a non-periodic duty cycle at a maximum power $P_{MAX}$ 255. In accordance with example power profile 250, femto AP (e.g., AP 130) transmitter power is lowered to a minimum power $P_{MIN}$ 265, which can be null, e.g., "OFF." Values of $P_{MAX}$ 255 and $P_{MIN}$ 265 can be based on various aspects of macro and femto cell wireless communication such as radio link quality, Node B and home Node B deployments, licensed and unlicensed radio resources available to service provider, and so forth. It is to be noted that at least one advantage of having a finite $P_{MIN}$ 265 is that a subscriber unit (e.g., UE 120$_A$) can attach substantially quickly to femto AP (e.g., AP 130) when in close proximity to the femto AP transmitter. The latter can offset at least in part access control time delay(s) associated with an "ON/OFF" pilot gating profile. It should be appreciated that time to acquire and complete LAU, or substantially any other attachment procedure is longer when pilot signal gating is ON in a duty cycle lesser than 100%. Establishment of $P_{MIN}$ 265 rather than an OFF condition for pilot signal power can facilitate unauthorized subscriber stations to camp in femto AP 240 and to operate in "emergency call only" mode of operation; the latter of particular relevance in femto coverage areas, e.g., area 145 with unavailable macro coverage.

It should be noted that signaling power is ramped-up with a slope 275$_U$, and ramped-down with a slope 275$_D$ rather than switching power up and/or down substantially instantaneously; e.g., "ON/OFF" profile. It is to be noted that transmitter power gating can create a variable interference environment for which these network(s) and UE substantially constantly adjust. Such interference environment can originate from the femto AP reuse of frequencies from macro network(s) and creation of interference among a femto cell and macro network(s) and subscriber(s) (e.g., UE 120$_A$ when served by macro Node B 110). In an aspect, schedule component 275 determines slopes 275$_U$ and 275$_D$ that are sufficiently steep to provide adequate pilot gating and yet sufficiently slow to afford power control compensation by interfered macro network(s). It should be appreciated that certain legacy macro technologies (e.g., GSM) have slower power control mechanisms to compensate for changes in the received signal quality detected by a mobile station when compared to modern telecommunication technologies. Accordingly, such legacy technologies can fail to respond to drastic interference changes caused by rapid gating of femto AP transmitter power, and thus can benefit from gradually ramped-up and ramped-down pilot gating. An artificial intelligence component (not shown) can conduct various analyses like utility analysis and exploit disparate methods (see above) to determined optimal values of $P_{MIN}$ 265, and slopes 275$_D$ and 275$_U$.

Figure 3:
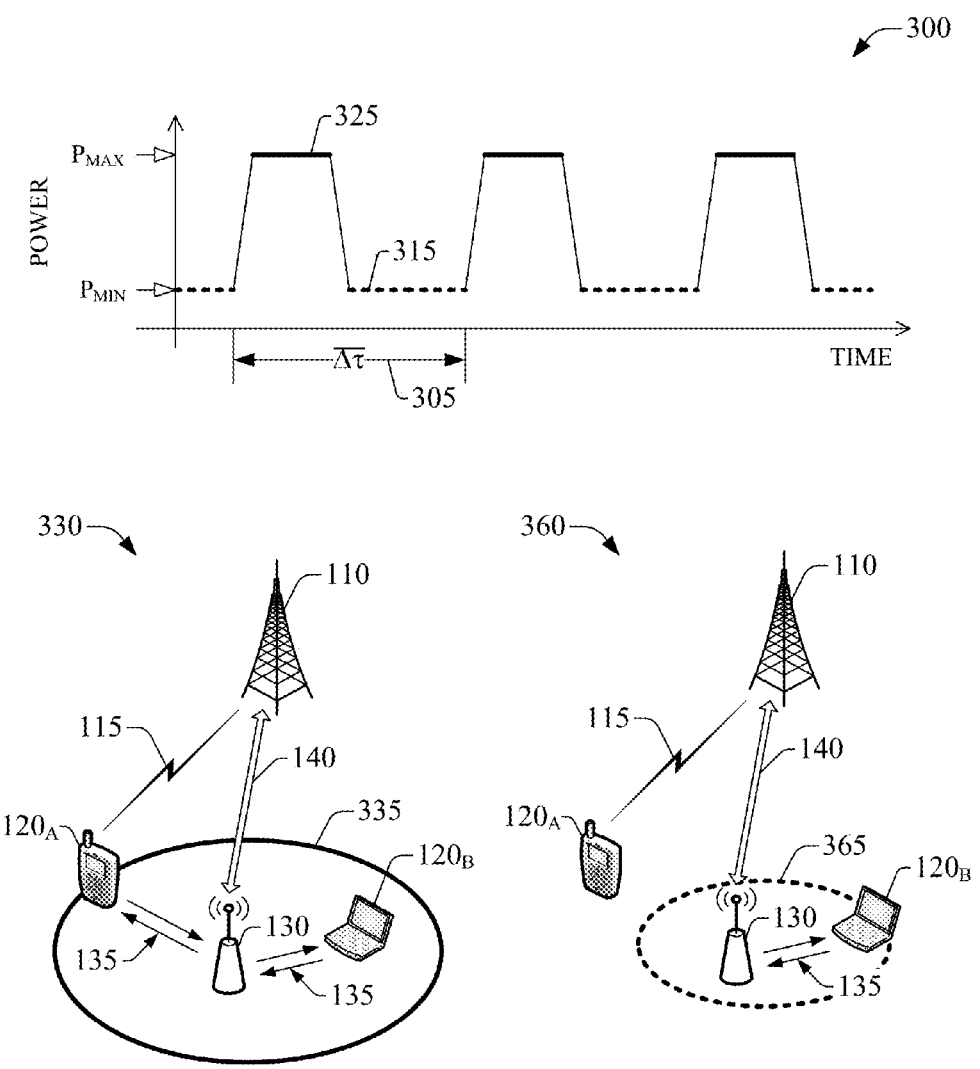
FIG. 3 illustrates mitigation of unnecessary attachment to a femto cell facilitated by gated pilot signaling in accordance with aspects described in the subject specification.

FIG. 3 illustrates mitigation of unnecessary attachment facilitated by gated pilot signaling. Diagram 300 presents an example femto AP transmitter power profile wherein power is periodically, with period $\Delta\tau$ 305, increased from a minimum value $P_{MIN}$ 315 to a maximum value $P_{MAX}$ 325. In illustrative power profile example 300, duty cycle is 33% with 17% ramp-up/down cycle.

Femto cell (e.g., femto AP 130) transmitter power $P_{MAX}$ and $P_{MIN}$ determine coverage range. Diagrams 330 and 360 illustrates, respectively, a coverage area 335 afforded in a duty cycle (e.g., when pilot power is at $P_{MAX}$ 325) of pilot power profile 300, and a coverage area 365 associated with $P_{MIN}$ 315. With respect to example scenario depicted in diagram 330, a mobile station 120$_A$ can attempt attachment to femto AP 130, via FL/RL 135, when the mobile station enters coverage area 335. For mobile stations like UE 120A that fail to be part of an authorized set (e.g., "whitelisted;" see below) of devices that can be served by femto AP 130, such attachment attempt and associated signaling load (e.g., LAU/RAU procedure) is unwarranted. Thus, for unauthorized devices, femto AP 130 interferes with macro network (e.g., Node B 110) and leads to excessive utilization of mobile's battery. It should be appreciated that attachment attempt by UE 120$_A$ can be carried upon in either (a) idle mode, e.g., when UE 120$_A$ scans for available channels for communication or conveys pilot signal(s) for location based services, or (b) in a call or data session. In an aspect, attachment attempt of "passerby" UE 120$_A$ on a call or data session can be an attempt to handover from macro cell to femto cell to offload the macro network. It should be further appreciated that passerby UE 120$_A$ can attempt attachment during the entire duty cycle of a pilot gating profile (e.g., power profile 300).

As depicted in diagram 330, nearly-OFF power cycle mitigates unnecessary attachment, or "passerby" effect. For example, when femto AP 130 transmitter is nearly-OFF, femto coverage shrinks to area 365, a UE 120$_A$ is less likely to detect and attempt to attach to femto AP 130 with gated pilots in nearly-OFF, idle mode when the mobile passes by the femto cell. It should be appreciated that when UE 120$_A$ moves throughout macro cell there is a low probability for the UE 120$_A$ to incur a second, third, and so forth, measurement of pilot signaling from AP 130 while femto transmitter is nearly-OFF or ON. Therefore, nearly-OFF period(s) in a pilot gating profile leads to reduced probability attachment (e.g., LAU procedure(s)) attempt by outdoor end users and battery life preservation of their wireless devices. Attachment probability is reduced to approximately the duty cycle (e.g., 33% in example power gating profile 300).

Conversely, it is to be noted that a quasi-stationary (indoor) wireless device 120$_B$ has substantially more time to measure femto AP 130 signaling on multiple occasions; therefore, probability of a successful measurement and attachment is substantially higher.

Figure 4:
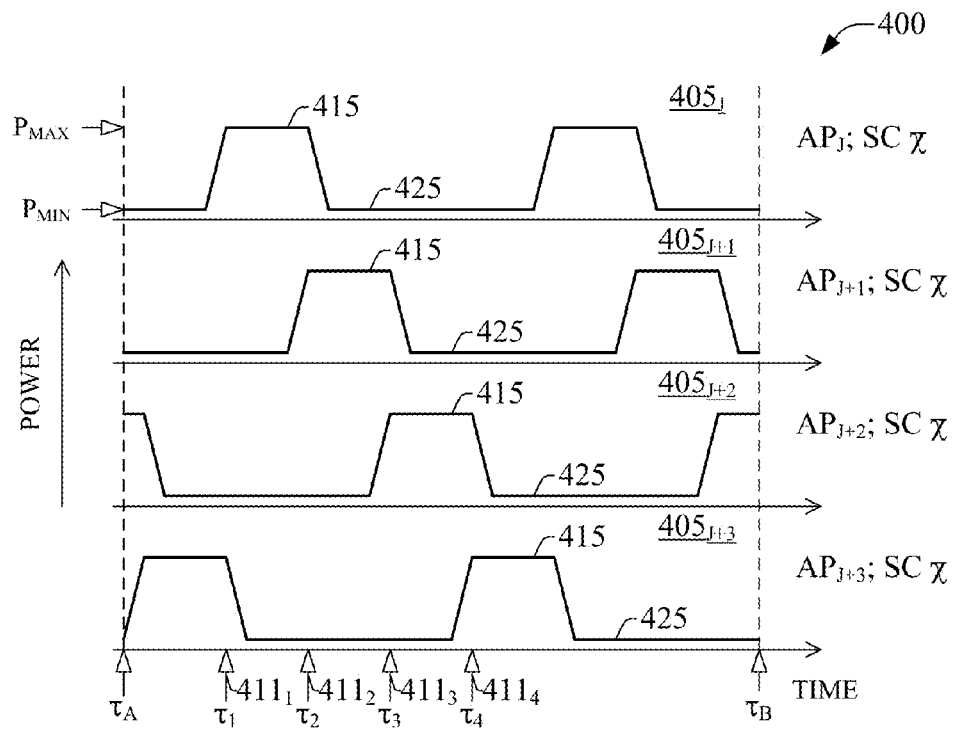
FIG. 4 illustrates utilization of transmitter power gating for macro cell to femto cell handover in accordance with aspects described herein.
Figure 4:
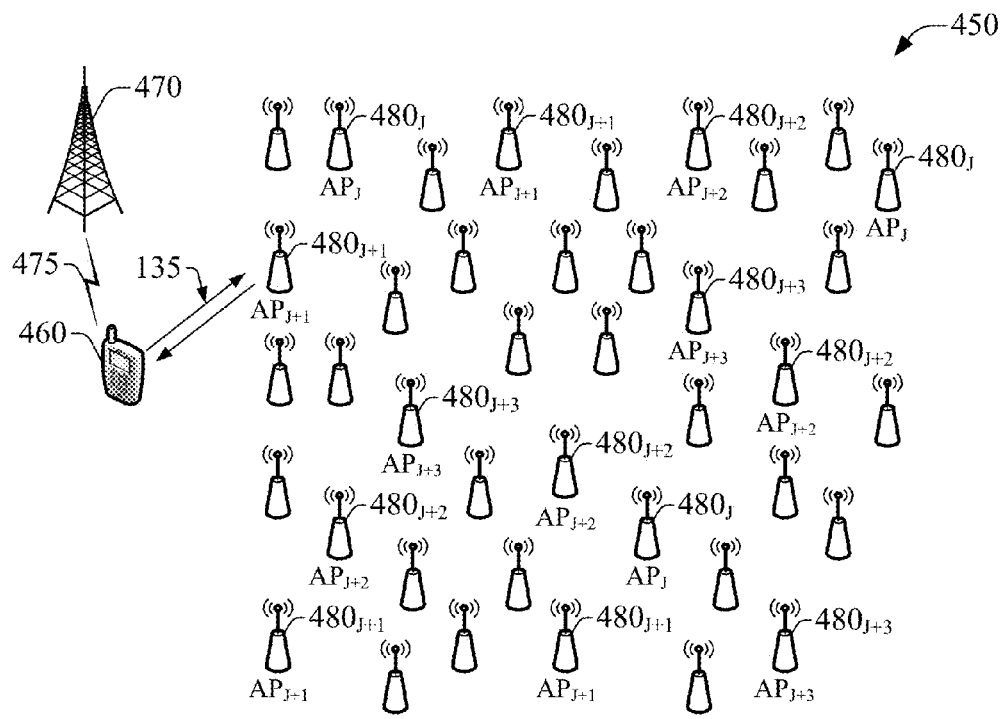

As discussed above, passerby subscriber stations can perform pilot measurements, or scans, in active mode, e.g., during a call or data session. Fast moving mobiles served by macro network(s) are substantially less like to attempt handover to a femto AP with a duty cycle substantially below 100%, e.g., "always-on" operation. Since femto AP operation at a nearly-OFF power substantially mitigates attachment signaling by substantially confining femto cell coverage to a smaller area. Reduction of attachment signaling associated with handover in an active call or data session can reduce signaling system #7 (SS7) signaling load and improve network operation. As illustrated in FIG. 4, it should be appreciated that utilization of transmitter power gating can further reduce macro-to-femto handover signaling, particularly of slow-moving subscriber units, with ensuing preservation of femto radio resources.

FIG. 4 illustrates a pilot gating reuse plan that reduces a number of femto APs that can participate in macro-to-femto handover. Diagram 400 illustrates example transmitter power profiles 405$_J$-405$_{J+3}$ associated, respectively, with femto cell AP$_J$-AP$_{J+3}$, which are identified at least in part through a scrambling code (SC) $\chi$ (e.g., a primary synchronization code, or a secondary synchronization code for femto cells that operate in a third generation network environment). It should be appreciated that while in example diagram 400 power profiles 405$_J$-405$_{J+3}$ are periodic with a same period and duty cycle, and have a same power depth $\Delta P = P_{MAX} - P_{MIN}$, with a common $P_{MAX}$ 415 and $P_{MIN}$ 425, and ramp-up/down slopes as well, disparate femto access points that share a cell ID can have disparate power gating profiles. In addition, it should be noted that the feature of power profiles 405$_J$-405$_{J+3}$ of a first femto AP powers down as a second femto AP sets $P_{MAX}$ (see instants sequence 411$_1$-411$_4$) can be partially relaxed through utilization of different duty cycles while it is ensured that disparate femto APs transmit at $P_{MAX}$ 415 at disparate time intervals. For example, femto AP$_{J+3}$ 405$_{J+3}$ can power down at a time earlier than $\tau_1$ 411$_1$, while AP$_J$ ramps power up at $\tau_1$ 411$_1$. In an aspect of the subject innovation, reuse planning component 216 can determine a power profile for each femto AP with a common cell ID.

Signaling gating profiles 405$_J$-405$_{J+3}$ distinguish each of femto cells AP$_J$-AP$_{J+3}$ even though such femto cells can share a cell ID provided at least in part by SC χ. Such distinction provides at least two advantages: (i) Mitigation of signaling load and improvement of macro cell capacity since macro-to-femto a handover request posed by a mobile station, and processed by a femto cell, are less likely to be directed to multiple femto APs at substantially the same time. (ii) Broadened femto cell ID scope. As a result, various femto cell operations like synchronization and location services can be improved.

In addition, it should be appreciated that in wireless networks like third generation UMTS networks, femto cell ID or home Node B identification relies on a limited supply of scrambling codes (e.g., Zhadoff-Chu sequences applied to a primary and a secondary synchronization channels). Thus, in a highly dense packing of femto cell APs typically due to limited macro neighbor space, adequate identification of femto cells can be difficult, particularly for conducting handover and associated measurements to determine which femto cell can best service a mobile upon handover. Distinction of femto cell APs through power gating profile can afford creation and management of "virtual neighbors," which are clusters of multiple femto access points, that can be employed to identify and execute macro-to-femto handover to a correct physical femto AP for a femto subscriber.

Diagram 450 illustrates the advantage of distinguishing femto cell APs through pilot gating reuse within a handover scenario. In an aspect of the subject innovation, mobile station 460, which is served by Node B 470 through a macro radio link 475, measures pilot signal from femto APs as part of a macro-to-femto handover procedure and reports, e.g., to a network management component (e.g., a femto cell gateway; not shown), strong signaling from a set of neighboring femto AP. In diagram 450, femto cell APs 480$_J$-480$_{J+3}$ share scrambling code SC x, whereas remaining illustrated yet not labeled femto APs have disparate scrambling codes. Since femto cells (e.g., 480$_J$-480$_{J+3}$) are further distinguished through pilot gating profiles (e.g., 405$_J$-405$_{J+3}$), a time at which measurements (e.g., a scan) are conducted by UE 460 can be included in the mobile's report. Therefore, the network management component can employ a known pilot gating reuse plan to ascertain a set of femto cells that are probed (e.g., scanned) by UE 460; for example, a set of femto cells {AP$_{J+1}$ 480$_{J+1}$} which comprise four femto APs in diagram 450. Thus, network management component can direct handover to such optimal femto cells rather than to a larger set of neighboring femto cells, which include AP$_J$ 480$_J$, AP$_{J+2}$ 480$_{J+2}$, and AP$_{J+3}$ 480$_{J+3}$ among other cells, reducing the subspace of failed handover realization from 14, the set of femto APs 480$_J$-480$_{J+3}$ with scrambling code SC χ, to four. It should be appreciated that in a deployment of $10^3$-$10^6$ femto cells, a power gating with duty cycle of 33% can substantially reduce the number of possible femto cells to which handover can be directed to. It is to be appreciated that deployment density of femto cells is substantially larger than deployment density of macro Node Bs.

Figure 5:
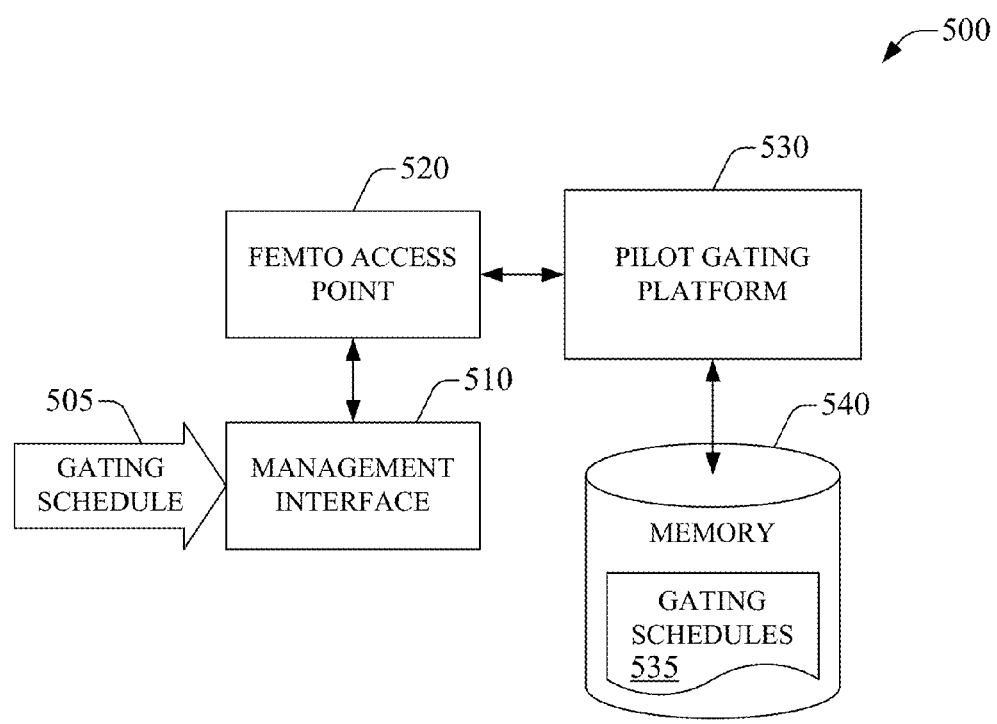
FIG. 5 is a block diagram of an example system that facilitates provision of a schedule plan for a gated pilot signal in a femto cell.

FIG. 5 is a block diagram of an example system 500 that facilitates provision of a schedule plan for a gated pilot signal in a femto cell. In system 500, a gating schedule 505 can be entered through a management interface 510 and provided to a femto access point 520. As discussed above, gating schedule 505 can include power depth $\Delta P = P_{MAX} - P_{MIN}$, duty cycle, period $\Delta \tau$, ramp-up/down slopes, and so forth. A subscriber who activates or configures femto access point 520 can be presented, via management interface 510, with an opportunity to provide gating schedules for disparate authorized subscribers or wireless devices that can be served by femto access point 520. A service provider can facilitate a privacy policy with respect to utilization of subscriber-issued gating schedules, and a privacy editor (not shown) as part of management interface 510 for the subscriber to modify at least in part the privacy policy.

Provision of a subscriber-issued gating schedule has at least two advantages. First, it provides energy conscious subscriber(s) with an opportunity to optimize power setting(s) of the femto AP (e.g., femto AP 130). Second, for business subscribers, determination of a customized gating schedule mitigates after-hours utilization of the femto AP within business premises; e.g., employee(s) downloads music, or browses social networking sites after end of business day. In addition, for home subscribers, a custom gating schedule can ensure end users within the household do not access femto cell resources at predetermined times, e.g., online gaming can be disabled from 11:00 p-7:00 a or during homework hours of school-age children; video-streaming during specific hours, etc. It should be appreciated that gating schedule 505 can be at least a portion of an access list (not shown), or a white list (not shown). Updates to subscriber-issued gating schedule(s) that affects subscribers associated with a specific white list(s) (e.g., employees' of a business, or members of a household) can be notified to the subscribers via email, instant message, short message service (SMS) communication, multimedia message service (MMS) communication, and the like.

It should be appreciated that white list(s) is an instrument (e.g., a component) for management of access to femto cell coverage or service. White list(s) facilitates femto access authorization, prioritization and revocation of subscriber(s) or subscriber station(s). As an example, white list(s) comprises wireless mobile station numbers approved for coverage through femto access point 130. It is to be noted that substantially any identification token(s), label(s), or code(s) that identify a subscriber station can be employed. White list(s) (not shown) can be stored in a data storage (e.g., in a memory) within femto AP 520, or memory 540, or substantially any memory or storage component available to a service provider.

It should be noted that white list(s) and gating schedule(s) can mutually complement or supplement functionalities. For example, pilot signal power gating provided by gating schedule 505 can synergistically benefit operation of femto access point 520 as configured via a white list. As another example, white list(s) can establish parameters that control femto AP 520 utilization such as the following. (i) Temporary access, e.g., full access for a specific time interval such as days or hours. (ii) Access only within a window of time in a day (voice and data allowed from 9:00 a-6:00 p, or voice allowed after 9:00 p, which can facilitate billing schemes already established by an operator/service provider). (iii) Access to specific applications like scheduler, calendar(s), news streaming, authoring tools, gaming, video and music, etc.

In an aspect of the subject innovation, management interface 510 can be a web-based online graphic user interface (GUI). However, it should be appreciated that it is possible to utilize other networked interfaces to configure information related to pilot signal power gating or substantially any other operation of femto AP 520 (e.g., femto AP address, authorized subscriber station number(s), add-on feature selection(s), etc.). Examples of alternative, or additional, management interface 510 are the following: voice or sound commanded interface(s), touch commanded interface(s), biometric commanded interfaces(s), and the like.

A pilot gating platform 530 can receive gating schedule 505 and store it in memory 540. Pilot gating platform 530 has substantially the same functionality of pilot gating platform 210. It should be appreciated that a set of one or more gating schedules 535 associated with disparate femto access points, or with various wireless devices that can be served through femto access point 520, can be stored in memory 540. It is to be noted that even though gating schedules 535 are stored externally with respect to pilot gating platform 530, such platform can also retain the gating schedules 535. In an aspect of the subject innovation, gating schedules 535 can be pre-configured with a model, updatable gating schedule. Additionally, pre-configured gating schedules can be stored as part of pre-populated access list(s), white list(s).

In view of the example systems described above, example methodologies that can be implemented in accordance with the disclosed subject matter can be better appreciated with reference to flowcharts in FIGS. 6-10. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 6:
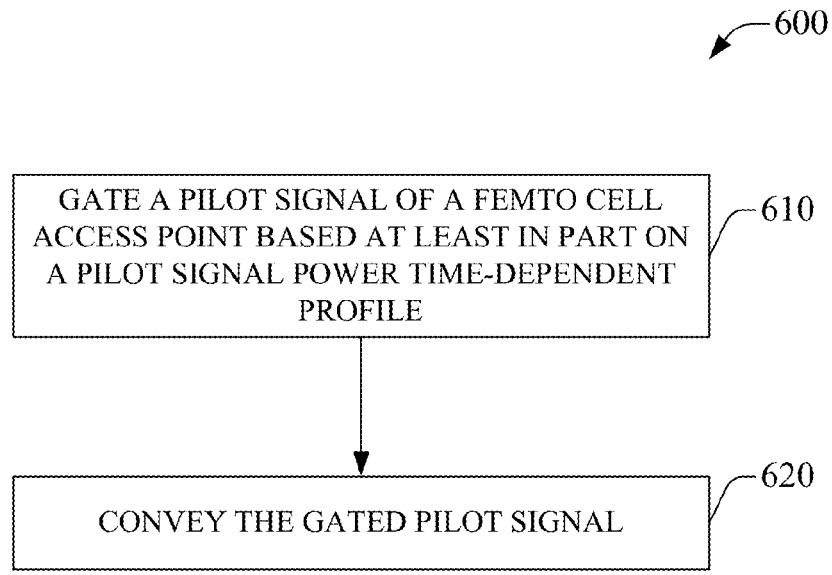
FIG. 6 presents a flowchart of an example methodology for activating and deactivating signaling of a femto cell according to aspects disclosed herein.

FIG. 6 presents a flowchart of an example methodology 600 for activating and deactivating signaling of a femto cell. At act 610, a pilot signal of a femto cell AP (e.g., femto AP 130) is gated based at least in part on a pilot signal power time-dependent profile (e.g., profiles 250), or pilot gating profile. Such profile can be periodic or non-periodic, and generally presents a duty cycle substantially below 100%. Disparate femto cell APs can posses distinctive pilot signal power profiles which can be employed for cell identification purposes in addition to cell ID codes (e.g., scrambling codes) or tokens, such as LAC or RAC. The distinctive pilot signal power profiles can be reused, as a phase for identification scrambling sequences. Additionally, disparate authorized (e.g., "whitelisted") subscribers can have disparate pilot profile depth (e.g., AP) based at least in part on their preferred femto coverage area to exploit femto cell signal and traffic. In addition, pilot signal power can be adjusted according to channel signal strength (e.g., received/measured channel quality indicators (CQIs)). Pilot signal power profile can be predetermined by a femto service provider based on customer information, such a business intelligence (e.g., demographics, additional services contracted by customer), or wireless devices intended to be served by the femto cell AP; e.g., MIMO-capable devices can employ a pilot power profile for each transceiver. At act 620, the gated pilot signal is conveyed.

Figure 7:
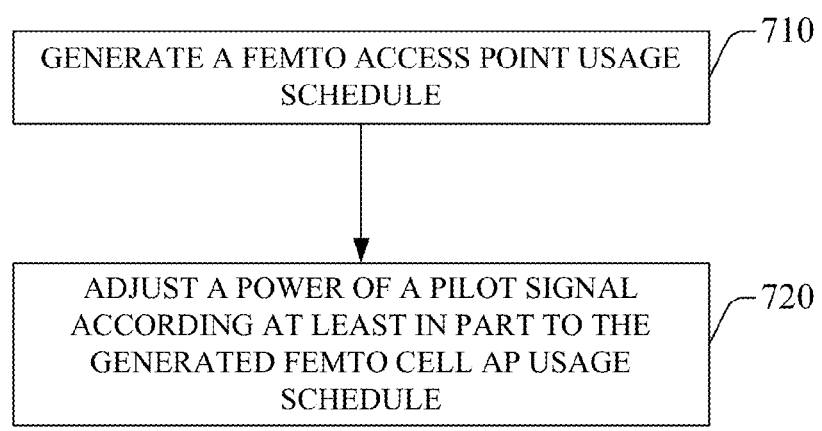
FIG. 7 presents a flowchart of an example methodology for generating a pilot signal power profile according to aspects described in the subject specification.

FIG. 7 presents a flowchart of an example methodology 700 for generating a pilot signal power profile. In an aspect of the subject innovation, the subject example methodology can be employed in conjunction with example methodology 600. At act 710, a femto AP usage schedule is generated. In an aspect of the subject innovation, such schedule can be generated through historic attachment data (e.g., attachment data 226). Moreover, a gating profile for the femto cell AP can be provided and managed (e.g., customized, updated) by an owner subscriber; for example, a subscriber can generate schedules or pilot gating profiles for disparate authorized (e.g., "whitelisted") subscribers based at least in part on their planned femto cell AP utilization schedules. In an aspect, usage schedules can be provided through a web-based interface (e.g., management interface 510). At act 720, power of a pilot signal is adjusted according, at least in part, to the generated femto cell usage schedule.

Figure 8:
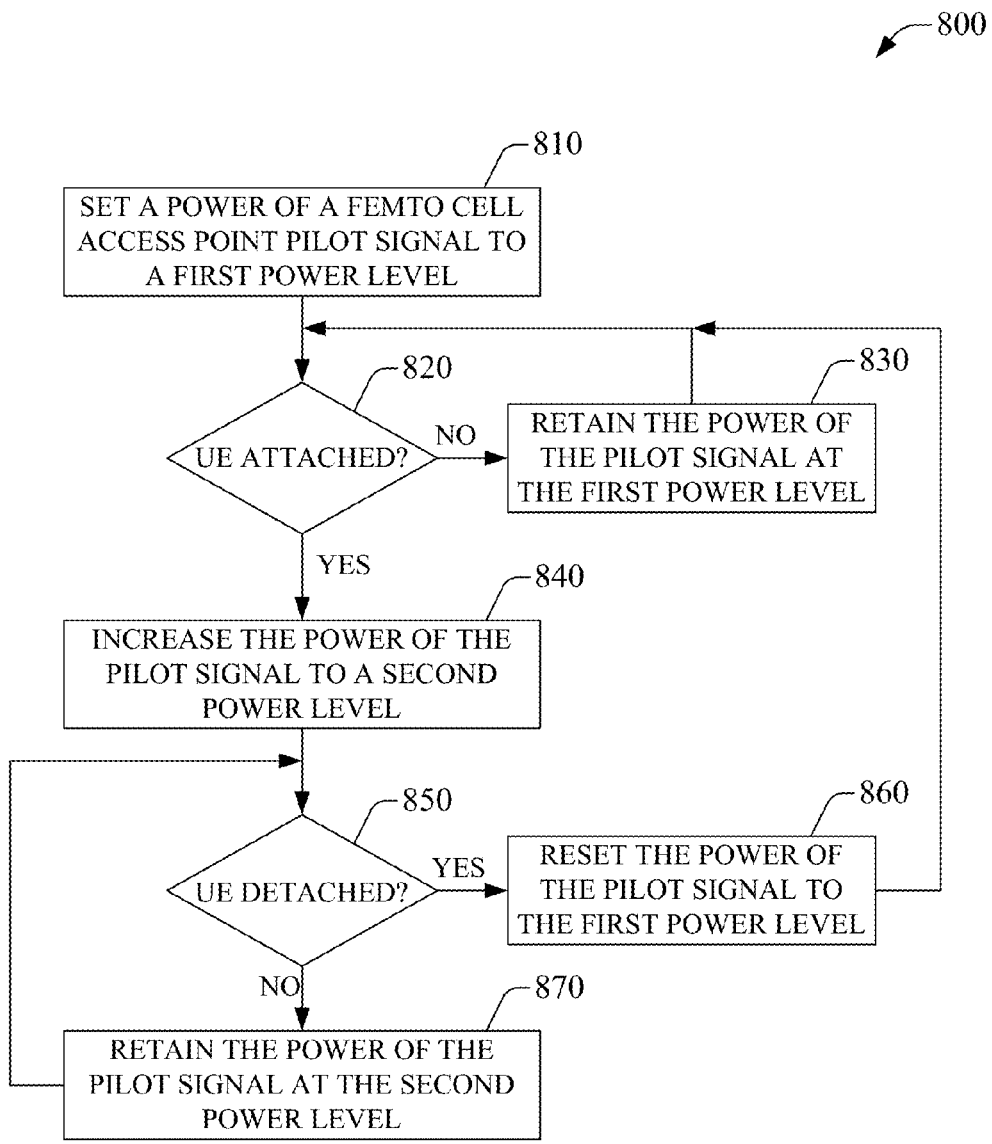
FIG. 8 is a flowchart of an example methodology for adjusting a pilot signal power profile in response to mobility attachment data according to aspects described herein.

FIG. 8 is a flowchart of an example methodology 800 for adjusting a pilot signal gating schedule in response to mobility attachment data. In an aspect, the subject example methodology can be utilized in conjunction with example methodologies 600 and 700. Example methodology 800 illustrates generation of a pilot gating profile in response to attachment data associated with mobile station(s) served by a femto cell. For example, presence or absence of a subscriber station in the femto cell can be monitored through mobility records stored in a memory (e.g., a VLR retained in a volatile or nonvolatile memory). Based at least in part on such information, pilot signal gating schedule can be adjusted.

At act 810, a power of a pilot signal of a femto cell AP is set to a first power level (e.g, $P_{MIN}$ 425). At act 820, the presence or absence of user equipment in the femto cell is probed by checking whether the UE is attached. In the affirmative case, power of the pilot signal is increased to a second power level (e.g., $P_{MAX}$ 415) and flow is directed to act 850. Conversely, power of the pilot signal is retained at the first level and flow is directed to act 820. Act 850 is a validation act that probes whether the UE has detached. Upon detachment, the power is the pilot signal is reset to the first power level at act 860 and flow is directed to act 820. Conversely, power of the pilot signal is retained at the second power level at act 870, and flow is directed to act 850.

Figure 9:
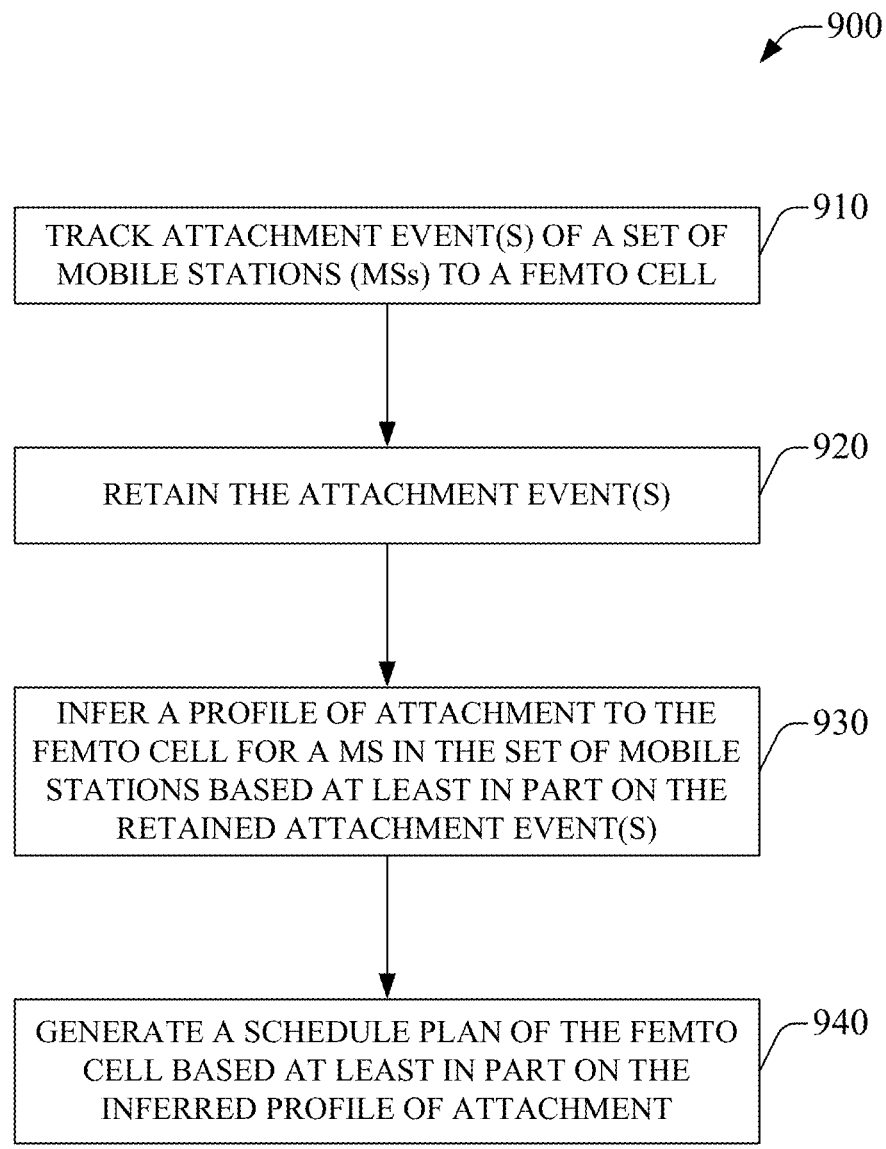
FIG. 9 is a flowchart of an example methodology for generating a schedule plan for pilot gating in response to mobility attachment data according to aspects described in the subject innovation.

FIG. 9 is a flowchart of an example methodology 900 for generating a schedule plan for pilot gating in response to mobility attachment data. This example methodology can be utilized in conjunction with substantially any example methodology described in the subject specification. At act 910, mobility attachment event(s) associated with a set of mobile stations attached, or handed over, from macro cell to femto cell are tracked. In an aspect, tracking can be implemented through a dedicated tracking component 214. At act 920, the attachment event(s) is retained. In an aspect, such event(s) can be retained in a Visitor Location Register (VLR) or substantially any other memory like attachment data 226 in memory 218. It should be appreciated that act 920 can facilitate, at least in part, enacting act 910, wherein tracking can include accessing the VLR. At act 930, a profile of attachment to the femto cell AP for a mobile station in the set of mobile stations to the femto cell can be inferred, or learned, based at least in part on the retained attachment event(s). In an aspect of the subject innovation, inferring, or learning, can be based at leas in part on various machine-learning methods and/or artificial intelligence methods disclosed hereinbefore in connection with aspects of schedule component 215. At act 940, a schedule plan, or usage schedule, for the femto cell is generated based at least in part on the inferred, or learned, attachment event(s) profile.

Figure 10:
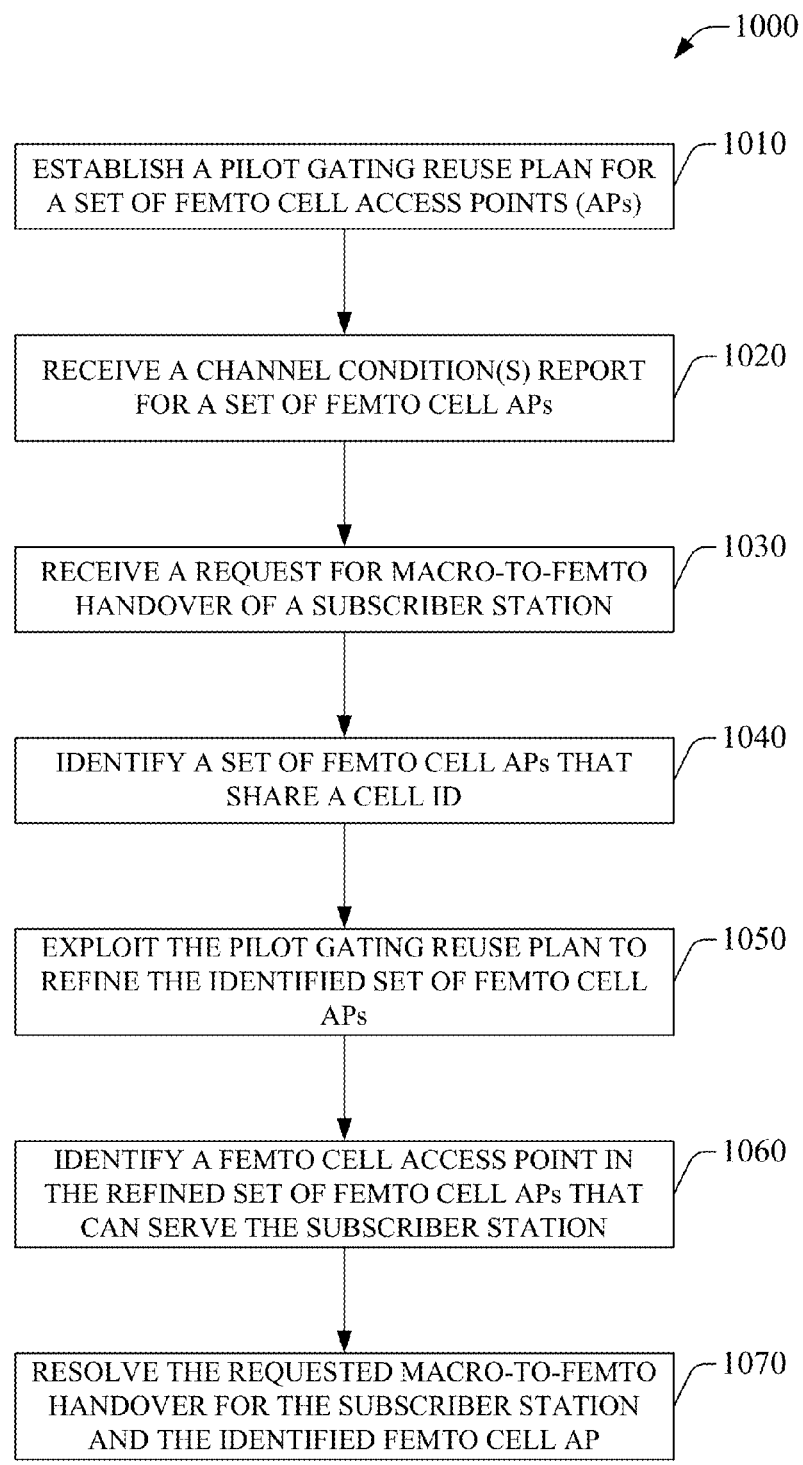
FIG. 10 presents a flowchart of an example methodology for resolving macro-to-femto handover of a subscriber station through pilot gating reuse according to aspects described herein.

FIG. 10 presents a flowchart of an example methodology 1000 for resolving handover of a subscriber station from a macro cell to a femto cell through pilot gating reuse. In an aspect of the subject innovation, a network management component (e.g., a femto cell gateway component within a wireless core network) can implement example methodology. At act 1010 a pilot reuse plan for a set of femto cell access points is established. In an aspect, a reuse planning component 216 determines the reuse plan. Such reuse plan can by dynamic, with variations entered as a function of time. It is to be noted that reuse planning component 216 can also implement other type of reuse plans, or strategies, like frequency planning.

At act 1020, a report on channel condition(s) is received for a set of femto cells access points. In an aspect, the report is generated through measurement(s) of radio link (e.g., link 135) signal strength conducted by a subscriber station. The report typically conveys a channel quality indicator (CQI), even though other information can be contained in the report such as reference signal over thermal noise values, and so forth. It should be appreciated that radio link, or channel, conditions are periodically or aperiodically measured by subscriber station(s) for various operational purposes; e.g., determination of interference levels, channel selection, power allocation, etc.

At act 1030, a request is received for macro-to-femto handover of a subscriber station. Such a request is typically conveyed through macro network management component like a radio network controller in UMTS network(s). However, it should be appreciated that such a request can be set forth by the subscriber station (e.g., UE $120_A$) in an attempt to attach on-demand with a specific femto cell. At act 1040, a set of femto cell APs that share a cell ID is identified. Such cell ID can be a predetermined scrambling sequence (e.g., a Zhadoff-Chu sequence).

At act 1050, a pilot gating reuse plan is exploited to refine the identified set of femto cell APs. In an aspect, a network management component (not shown), via a reuse planning component 216, for example, identifies one or more femto APs (e.g., $AP_{J+1}$ $480_{J+1}$) which had active pilot signal (e.g., pilot profile in duty cycle) when the subscriber station conducted a radio link scan, or channel measurements. It should be appreciated that the identification of such APs with an active pilot relies at least in part upon a time(s) when the subscriber station communicated a channel measurement report relative to known edges of pilot signal activity/inactivity cycle; e.g., $\tau_1$ $411_1$, $\tau_2$ $411_2$, $\tau_3$ $411_3$, or $\tau_4$ $411_4$. In a scenario wherein the mobile channel condition(s) report is substantially near, or during, a pilot activity/inactivity edge (e.g., $\tau_2$ $411_2$), multiple femto cell APs within at least two pilot gating phases (e.g., $405_J$-$405_{J+3}$) can be regarded as members of the refined set of femto cells. At act 1060, a femto cell AP that can serve the subscriber station is identified within the refined set of femto cell APs. In an aspect, such identification can be based at least in part on an access list (e.g., a white list) of wireless devices authorized to be served by a femto cell AP. At act 1070, the requested macro-to-femto handover for the subscriber station and the identified femto cell AP is resolved; e.g., accepted/rejected and executed.

Figure 11:
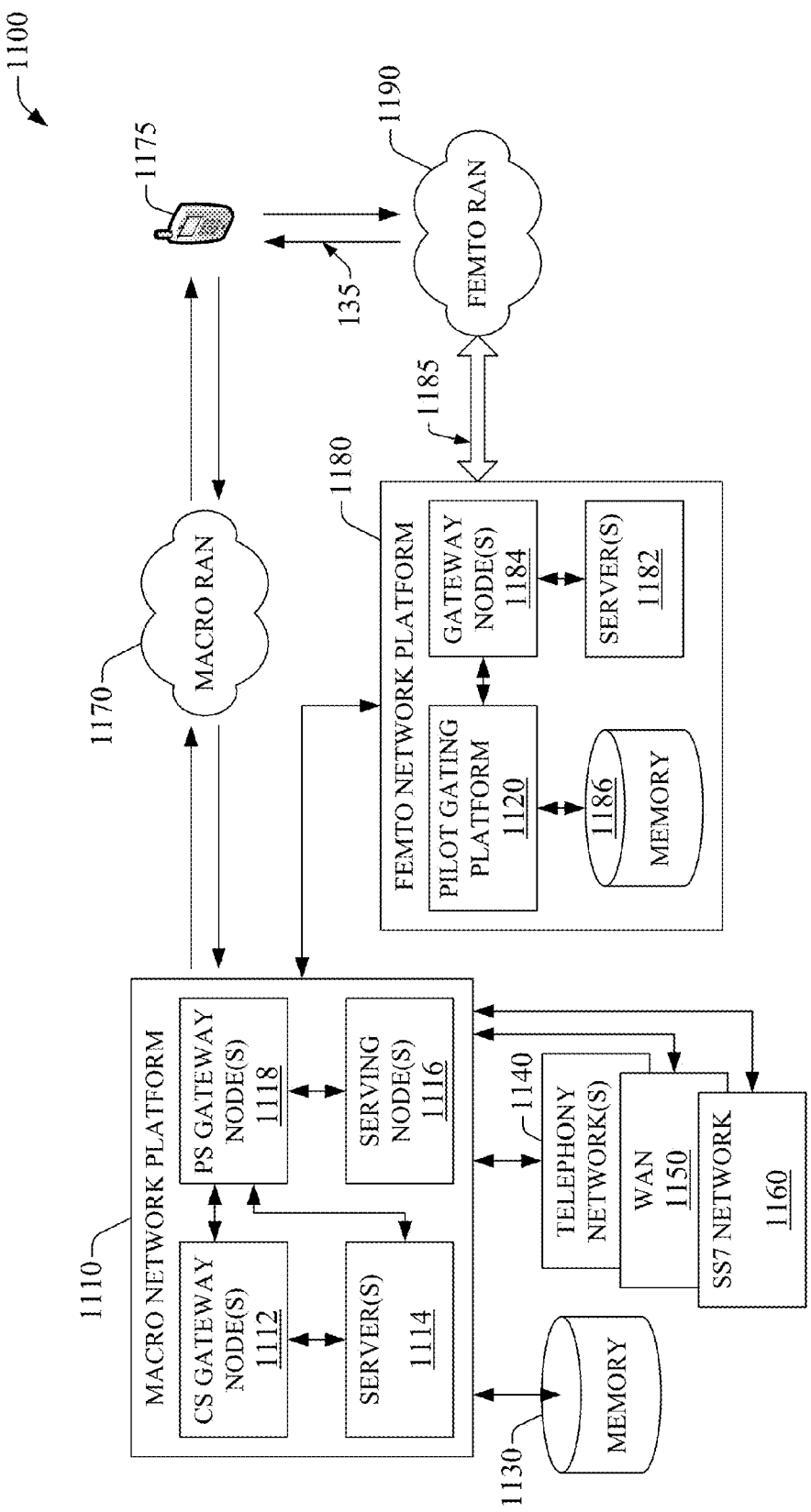
FIG. 11 illustrates an example wireless communication environment 1100, with associated components for operation of a femto cell in accordance with aspects described herein.
Figure 12:
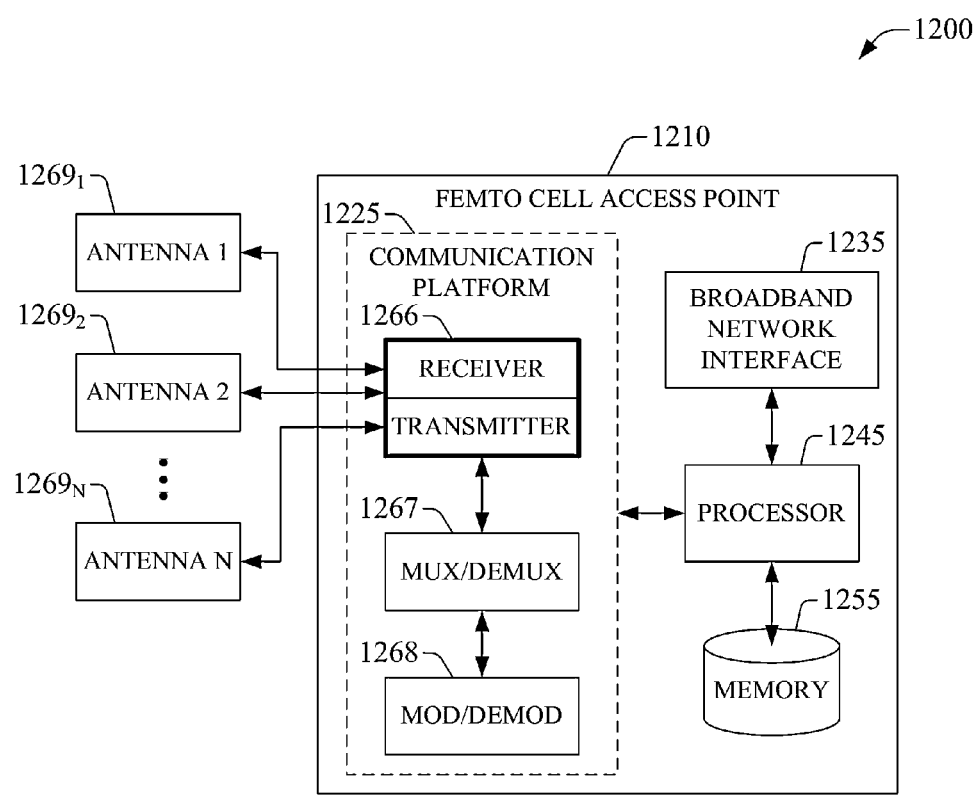
FIG. 12 illustrates a block diagram of an example embodiment of a femto access point that can transmit pilot signal(s) in accordance with aspects described herein.

To provide further context for various aspects of the subject specification, FIGS. 11 and 12 illustrate, respectively, an example wireless communication environment 1100, with associated components for operation of a femto cell, and a block diagram of an example embodiment 1200 of a femto access point which can transmit pilot signal(s) in accordance with aspects described herein.

Wireless communication environment 1100 includes two wireless network platforms: (i) A macro network platform 1110 which serves, or facilitates communication) with user equipment 1175 via a macro radio access network (RAN) 1170. It should be appreciated that in cellular wireless technologies (e.g., 3GPP UMTS, HSPA, 3GPP LTE, 3GPP UMB), macro network platform 1110 is embodied in a Core Network. (ii) A femto network platform 1180, which can provide communication with UE 1175 through a femto RAN 1190 linked to the femto network platform 1180 via backhaul pipe(s) 1185, wherein backhaul pipe(s) are substantially the same a backhaul link 140. It should be appreciated that femto network platform 1180 typically offloads UE 1175 from macro network, once UE 1175 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1170 can comprise various coverage cells like cell 105, while femto RAN 1190 can comprise multiple femto cell access points. As mentioned above, it is to be appreciated that deployment density in femto RAN 1190 is substantially higher than in macro RAN 1170.

Generally, both macro and femto network platforms 1110 and 1180 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1110 includes CS gateway node(s) 1112 which can interface CS traffic received from legacy networks like telephony network(s) 1140 (e.g., public switched telephone network (PSTN), or public land mobile network (PLMN)) or a SS7 network 1160. Circuit switched gateway 1112 can authorize and authenticate traffic (e.g., voice) arising from such networks. Additionally, CS gateway 1112 can access mobility, or roaming, data generated through SS7 network 1160; for instance, mobility data stored in a VLR, which can reside in memory 1130. Moreover, CS gateway node(s) 1112 interfaces CS-based traffic and signaling and gateway node(s) 1118. As an example, in a 3GPP UMTS network, gateway node(s) 218 can be embodied in gateway GPRS support node(s) (GGSN).

In addition to receiving and processing CS-switched traffic and signaling, gateway node(s) 1118 can authorize and authenticate PS-based data sessions with served (e.g., through macro RAN) wireless devices. Data sessions can include traffic exchange with networks external to the macro network platform 1110, like wide area network(s) (WANs) 1150; it should be appreciated that local area network(s) (LANs) can also be interfaced with macro network platform 1110 through gateway node(s) 1118. Gateway node(s) 1118 generates packet data contexts when a data session is established. To that end, in an aspect, gateway node(s) 1118 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1114. It is to be noted that in 3GPP UMTS network(s), gateway node(s) 1118 (e.g., GGSN) and tunnel interface (e.g., TTG) comprise a packet data gateway (PDG).

Macro network platform 1110 also includes serving node(s) 1116 that convey the various packetized flows of information, or data streams, received through gateway node(s) 1118. As an example, in a 3GPP UMTS network, serving node(s) can be embodied in serving GPRS support node(s) (SGSN).

As indicated above, server(s) 1114 in macro network platform 1110 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1110. Data streams can be conveyed to gateway node(s) 1118 for authorization/authentication and initiation of a data session, and to serving node(s) 1116 for communication thereafter. Server(s) 1114 can also effect security (e.g., implement one or more firewalls) of macro network platform 1110 to ensure network's operation and data integrity in addition to authorization and authentication procedures that CS gateway node(s) 1112 and gateway node(s) 1118 can enact. Moreover, server(s) 1114 can provision services from external network(s), e.g, WAN 1150, or Global Positioning System (GPS) network(s) (not shown). It is to be noted that server(s) 1114 can include one or more processor configured to confer at least in part the functionality of macro network platform 1110. To that end, the one or more processor can execute code instructions stored in memory 1130, for example.

In example wireless environment 1100, memory 1130 stores information related to operation of macro network platform 1110. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN(s) 1150, or SS7 network 1160.

Regarding femto network platform 1180, it includes pilot gating platform 1120, which can operate in accordance with aspects and features described in the subject specification in connection with pilot gating platform 210. While illustrated as external to femto gateway node(s) 1184, it should be appreciated that pilot gating platform 1120 can be an integral part of gateway node(s) 1184.

Femto gateway node(s) 1184 have substantially the same functionality as PS gateway node(s) 1118. Additionally, femto gateway node(s) 1184 can also include substantially all functionality of serving node(s) 1116. In an aspect, femto gateway node(s) 1184 facilitates handover resolution, e.g., assessment and execution, Server(s) 1182 have substantially the same functionality as described in connection with server(s) 1114. In an aspect, server(s) 1182 can execute multiple application(s) that provide service (e.g., voice and data) to wireless devices served through femto RAN 1190. Server(s) 1182 can also provide security features to femto network platform. In addition, server(s) 1182 can manage (e.g., schedule, queue, format . . . ) substantially all packetized flows (e.g., IP-based, frame relay-based, ATM-based) it generates in addition to data received from macro network platform 1110. It is to be noted that server(s) 1182 can include one or more processor configured to confer at least in part the functionality of macro network platform 1110. To that end, the one or more processor can execute code instructions stored in memory 1186, for example.

Memory 1186 can include information relevant to operation of the various components of femto network platform 1180. For example operational information that can be stored in memory 1186 can comprise, but is not limited to, subscriber information; contracted services; maintenance and service records; femto cell configuration (e.g., pilot gating schedule(s) 222, attachment data 226, devices served through femto RAN 1190; access control lists, or white lists); service policies and specifications; privacy policies; add-on features; and so forth.

With respect to FIG. 12, in example embodiment 1200, femto cell AP 1210 can receive and transmit signal(s) (e.g., traffic and control signals) from and to wireless devices, access terminals, wireless ports and routers, etc., through a set of antennas $1269_1$-$1269_N$. It should be appreciated that while antennas $1269_1$-$1269_N$ are a part of communication platform 1225, which comprises electronic components and associated circuitry that provides for processing and manipulating of received signal(s) (e.g., a packet flow) and signal(s) (e.g., a broadcast control channel) to be transmitted. In an aspect, communication platform 1225 includes a transmitter/receiver (e.g., a transceiver) 1266 that can convert signal(s) from analog format to digital format upon reception, and from digital format to analog format upon transmission. In addition, receiver/transmitter 1266 can divide a single data stream into multiple, parallel data streams, or perform the reciprocal operation. Coupled to transceiver 1266 is a multiplexer/demultiplexer 1267 that facilitates manipulation of signal in time and frequency space. Electronic component 1267 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1267 can scramble and spread information (e.g., codes) according to substantially any code known in the art; e.g., Hadamard-Walsh codes, Baker codes, Kasami codes, polyphase codes, and so on. A modulator/demodulator 1268 is also a part of operational group 1225, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1210 also includes a processor 1245 configured to confer functionality, at least partially, to substantially any electronic component in the femto access point 1210, in accordance with aspects of the subject innovation. In particular, processor 1245 can facilitate femto AP 1210 to implement configuration instructions received through communication platform 1225, which can include storing data in memory 1255. In addition, processor 1245 facilitates femto AP 1210 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1245 can manipulate antennas $1269_1$-$1269_N$ to provide distinct pilot signal gating; facilitate beamforming or selective radiation pattern formation, which can benefit specific locations (e.g., basement, home office . . . ) covered by femto AP; and exploit substantially any other advantages associated with smart-antenna technology. Memory 1255 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on.

Moreover, memory 1255 can store configuration information such as schedules (e.g., gating schedule(s) 222) and policies; femto AP address(es) or geographical indicator(s); acces lists (e.g., white lists); license(s) for utilization of add-features for femto AP 1210, and so forth.

In embodiment 1200, processor 1245 is coupled to the memory 1255 in order to store and retrieve information necessary to operate and/or confer functionality to communication platform 1225, broadband network interface 1235 (e.g., a broadband modem), and other operational components (e.g., multimode chipset(s), power supply sources . . . ; not shown) that support femto access point 1210.

It is to be noted that aspects, features, or advantages of the subject innovation described in the subject specification can be exploited in substantially any wireless communication technology. For instance, Wi-Fi, WiMAX, Enhanced GPRS, 3GPP LTE, 3GPP2 UMB, 3GPP UMTS, HSPA, or Zigbee. Additionally, substantially all aspects of the subject innovation as disclosed in the subject specification can be exploited in legacy telecommunication technologies; e.g., GSM.

In addition, it is to be noted that the various aspects disclosed in the subject specification can also be implemented through (i) program modules stored in a computer-readable storage medium or memory (e.g., memory 1186 or memory 1255) and executed by a processor (e.g., processor 1245), or (ii) other combination(s) of hardware and software, or hardware and firmware.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A femtocell device, comprising:
    a processor; and
    a memory that stores executable instructions that, when executed by the processor, facilitate performance of operations, comprising:
        determining a duty cycle schedule for a pilot signal of the femtocell device based on a history of attachment events between a macro cell device and the femtocell device;
        determining a threshold slope of a change in power over time for the pilot signal, wherein a first rate of change associated with the threshold slope satisfies a defined slope function that mitigates an induced interference condition in a wireless environment in which the femtocell device operates; and
        changing a power of the pilot signal over time at a second rate of change that is not greater than the first rate of change, wherein the changing the power is in accordance with the duty cycle schedule.

2. The femtocell device of claim 1, wherein the determining the duty cycle schedule comprises determining an attachment pattern based on the history of attachment events.

3. The femtocell device of claim 1, wherein the operations further comprise identifying an attachment event associated with another femtocell device.

4. The femtocell device of claim 3, wherein the operations further comprise determining a reuse interval that relates to an interval between a first time associated with the attachment event and a second time associated with a second attachment event associated with the femtocell device.

5. The femtocell device of claim 4, wherein the determining the duty cycle schedule comprises determining the duty cycle schedule based on the reuse interval.

6. The femtocell device of claim 1, wherein the operations further comprise facilitating copying the duty cycle schedule to a storage device associated with another femtocell device.

7. The femtocell device of claim 6, wherein the operations further comprise constructing a reuse plan to reuse the duty cycle schedule for the other femtocell device based on an identifier that is common to the femtocell device and the other femtocell device.

8. A non-transitory computer readable storage device comprising executable instructions that, in response to execution, cause a system comprising a processor to perform operations, comprising: constructing a duty cycle schedule for a pilot signal of the femtocell device based on based on a history of attachment events between a macro cell device and the femtocell device; identifying a maximum rate of change in power over time for the pilot signal, wherein the maximum rate of change satisfies a defined slope function defined to mitigate an induced interference condition in a wireless environment in which the femtocell device operates; and updating a power of the pilot signal over time at a second rate of change that is not greater than the first rate of change in accordance with the duty cycle schedule.

9. The non-transitory computer readable storage device of claim 8, wherein the constructing the duty cycle schedule comprises determining an attachment pattern based on the history of attachment events.

10. The non-transitory computer readable storage device of claim 8, wherein the operations further comprise identifying an attachment event associated with another femtocell device.

11. The non-transitory computer readable storage device of claim 10, wherein the operations further comprise determining a reuse interval that relates to an interval between a first time associated with the attachment event and a second time associated with a second attachment event associated with the femtocell device.

12. The non-transitory computer readable storage device of claim 11, wherein the constructing the duty cycle schedule comprises constructing the duty cycle schedule based on the reuse interval.

13. The non-transitory computer readable storage device of claim 8, wherein the operations further comprise facilitating copying the duty cycle schedule to a storage medium associated with another femtocell device.

14. The non-transitory computer readable storage device of claim 13, wherein the operations further comprise determining a reuse plan to reuse the duty cycle schedule for the other femtocell device based on an identifier that is common to the femtocell device and the other femtocell device.

15. A method, comprising:
    determining, by a system comprising a processor, a duty cycle schedule for a pilot signal of the femtocell device based on a history of attachment events between a macro cell device and the femtocell device;
    identifying, by the system, a threshold rate of change in power over time for the pilot signal, wherein the threshold rate of change satisfies a defined slope function determined to mitigate an induced interference condition in a wireless environment in which the femtocell device operates; and
    changing, by the system, a power of the pilot signal over time at a second rate of change that is less than the first rate of change, wherein the changing the power is in accordance with the duty cycle schedule.

16. The method of claim 15, wherein the determining the duty cycle schedule comprises determining an attachment pattern based on the history of attachment events.

17. The method of claim 15, further comprising identifying an attachment event associated with another femtocell device.

18. The method of claim 17, further comprising determining a reuse interval that relates to an interval between a first time associated with the attachment event and a second time associated with a second attachment event associated with the femtocell device.

19. The method of claim 18, wherein the determining the duty cycle schedule comprises determining the duty cycle schedule based on the reuse interval.

20. The method of claim 15, wherein the operations further comprise facilitating copying the duty cycle schedule to a memory associated with another femtocell device.

* * * * *